US012607736B2

(12) United States Patent
Kitamura et al.

(10) Patent No.: US 12,607,736 B2
(45) Date of Patent: Apr. 21, 2026

(54) RADAR DEVICE AND RADAR IMAGE GENERATION METHOD

(71) Applicant: Mitsubishi Electric Corporation, Tokyo (JP)

(72) Inventors: Takayuki Kitamura, Tokyo (JP); Kei Suwa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 267 days.

(21) Appl. No.: 17/966,041

(22) Filed: Oct. 14, 2022

(65) Prior Publication Data

US 2023/0039504 A1 Feb. 9, 2023

Related U.S. Application Data

(63) Continuation of application No. PCT/JP2020/023091, filed on Jun. 11, 2020.

(51) Int. Cl.
*G01S 13/89* (2006.01)

(52) U.S. Cl.
CPC ..................................... *G01S 13/89* (2013.01)

(58) Field of Classification Search
CPC ...................................................... G01S 13/89
See application file for complete search history.

(56) References Cited

U.S. PATENT DOCUMENTS 9,417,356 B2    8/2016  Chen et al.
10,353,067 B2 *  7/2019  Moulder ............... G01S 13/887
10,495,748 B2   12/2019  Daisy et al.

(Continued)

FOREIGN PATENT DOCUMENTS

JP              6030602 B2    11/2016
JP          2019-52952 A      4/2019
WO    WO 2019/024170 A1      2/2019

OTHER PUBLICATIONS

Gao et al.,"Novel Efficient 3D Short-Range Imaging Algorithms for a Scanning 1D-MIMO Array," IEEE Transactions on Image Proceeding, vol. 27, No. 7, Jul. 2018, pp. 3631-3643 (total 14 pages).

(Continued)

*Primary Examiner* — Bernarr E Gregory
*Assistant Examiner* — Nazra Nur Waheed
(74) *Attorney, Agent, or Firm* — Birch, Stewart, Kolasch & Birch, LLP

(57) ABSTRACT

A radar device includes: a control unit to cause a series of processing to be repeatedly executed, the series of processing including transmitting transmission signals to space using transmission antennas arranged linearly, receiving reflected signals that are the transmission signals reflected in the space using reception antennas linearly arranged in the same direction as the transmission antennas, transmitting the transmission signals simultaneously from the transmission antennas, receiving the reflected signals by the reception antennas, and acquiring digital data; and a signal processing unit to generate a three-dimensional radar image of a target moved in a direction crossing an antenna arrangement direction of the transmission antennas and the reception antennas by using the digital data sequentially acquired in the series of processing repeatedly executed as two-dimensional array data.

7 Claims, 15 Drawing Sheets

(56) References Cited

U.S. PATENT DOCUMENTS

| | | | |
|---|---|---|---|
| 2016/0146931 A1 | 5/2016 | Rao et al. | |
| 2020/0209380 A1 | 7/2020 | Takayama | |
| 2021/0088649 A1 | 3/2021 | Qi et al. | |
| 2021/0333386 A1* | 10/2021 | Park | G01S 7/356 |
| 2022/0390592 A1* | 12/2022 | Cornic | G01S 13/933 |

OTHER PUBLICATIONS

Gonzalez-Valdes et al., "Millimeter Wave Imaging Architecture for On-The-Move Whole Body Imaging," IEEE Transactions on Antennas and Propagation, vol. 64, No. 5, May 2016, pp. 1-12.
International Search Report (PCT/ISA/210) issued in PCT/JP2020/023091, dated Aug. 25, 2020.
Office Action issued in Japanese Patent Application No. 2020-555255, dated Dec. 1, 2020.
Office Action issued in Japanese Patent Application No. 2020-555255, dated Mar. 30, 2021.
Written Opinion of the International Searching Authority (PCT/ISA/237) issued in PCT/JP2020/023091, dated Aug. 25, 2020.
Zhu et al.,"Demonstration of 3-D Security Imaging at 24 GHz With a 1-D Sparse MIMO Array," IEEE Geoscience and Remote Sensing Letters, Jan. 2020, pp. 1-5.
German Office Action for German Application No. 11 2020 007 038.7, dated Aug. 25, 2023, with English translation.

* cited by examiner

FIG. 9

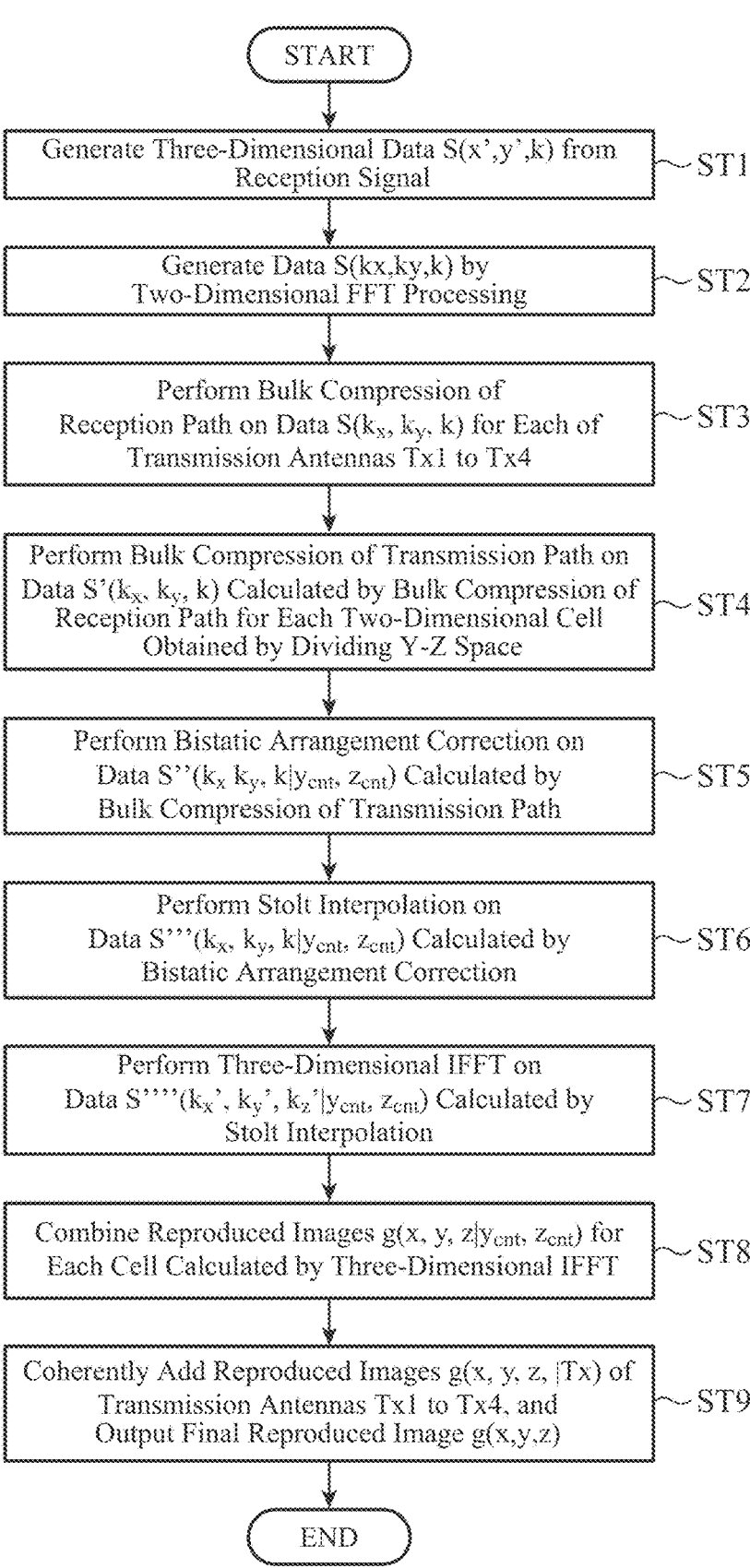

START

Generate Three-Dimensional Data S(x',y',k) from Reception Signal ~ST1

Generate Data S(kx,ky,k) by Two-Dimensional FFT Processing ~ST2

Perform Bulk Compression of Reception Path on Data $S(k_x, k_y, k)$ for Each of Transmission Antennas Tx1 to Tx4 ~ST3

Perform Bulk Compression of Transmission Path on Data $S'(k_x, k_y, k)$ Calculated by Bulk Compression of Reception Path for Each Two-Dimensional Cell Obtained by Dividing Y-Z Space ~ST4

Perform Bistatic Arrangement Correction on Data $S''(k_x, k_y, k|y_{cnt}, z_{cnt})$ Calculated by Bulk Compression of Transmission Path ~ST5

Perform Stolt Interpolation on Data $S'''(k_x, k_y, k|y_{cnt}, z_{cnt})$ Calculated by Bistatic Arrangement Correction ~ST6

Perform Three-Dimensional IFFT on Data $S''''(k_x', k_y', k_z'|y_{cnt}, z_{cnt})$ Calculated by Stolt Interpolation ~ST7

Combine Reproduced Images $g(x, y, z|y_{cnt}, z_{cnt})$ for Each Cell Calculated by Three-Dimensional IFFT ~ST8

Coherently Add Reproduced Images $g(x, y, z, |Tx)$ of Transmission Antennas Tx1 to Tx4, and Output Final Reproduced Image g(x,y,z) ~ST9

END

FIG. 16

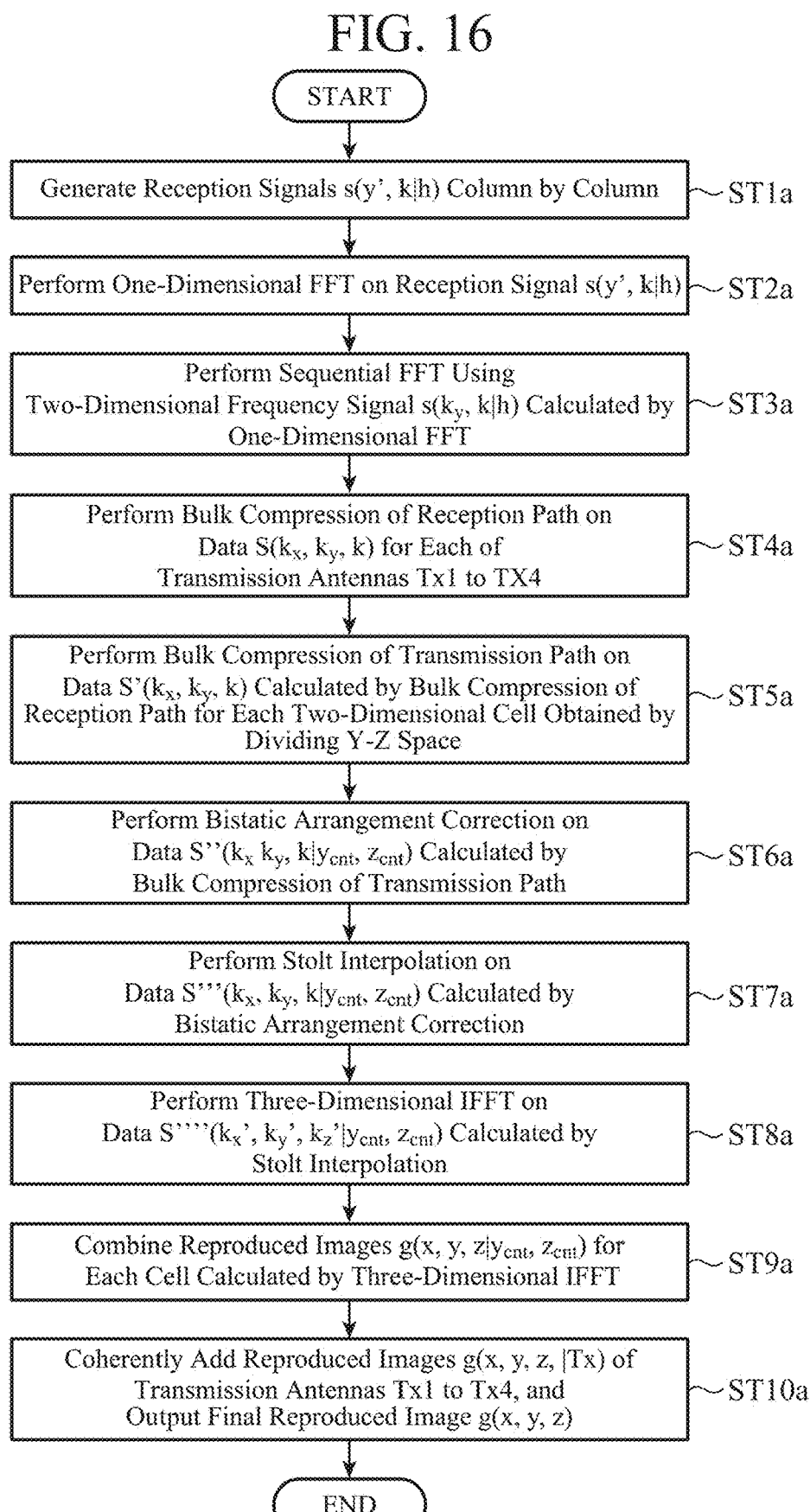

START

Generate Reception Signals s(y', k|h) Column by Column ~ST1a

Perform One-Dimensional FFT on Reception Signal s(y', k|h) ~ST2a

Perform Sequential FFT Using
Two-Dimensional Frequency Signal s($k_y$, k|h) Calculated by
One-Dimensional FFT ~ST3a Perform Bulk Compression of Reception Path on
Data S($k_x$, $k_y$, k) for Each of
Transmission Antennas Tx1 to TX4 ~ST4a Perform Bulk Compression of Transmission Path on
Data S'($k_x$, $k_y$, k) Calculated by Bulk Compression of
Reception Path for Each Two-Dimensional Cell Obtained by
Dividing Y-Z Space ~ST5a Perform Bistatic Arrangement Correction on
Data S''($k_x$ $k_y$, k|$y_{cnt}$, $z_{cnt}$) Calculated by
Bulk Compression of Transmission Path ~ST6a Perform Stolt Interpolation on
Data S'''($k_x$, $k_y$, k|$y_{cnt}$, $z_{cnt}$) Calculated by
Bistatic Arrangement Correction ~ST7a Perform Three-Dimensional IFFT on
Data S''''($k_x$', $k_y$', $k_z$'|$y_{cnt}$, $z_{cnt}$) Calculated by
Stolt Interpolation ~ST8a Combine Reproduced Images g(x, y, z|$y_{cnt}$, $z_{cnt}$) for
Each Cell Calculated by Three-Dimensional IFFT ~ST9a Coherently Add Reproduced Images g(x, y, z, |Tx) of
Transmission Antennas Tx1 to Tx4, and
Output Final Reproduced Image g(x, y, z) ~ST10a

END

RADAR DEVICE AND RADAR IMAGE GENERATION METHOD

CROSS REFERENCE TO RELATED APPLICATIONS

This application is a Continuation of PCT International Application No. PCT/JP2020/023091, filed on Jun. 11, 2020, which is hereby expressly incorporated by reference into the present application.

TECHNICAL FIELD

The present disclosure relates to a radar device and a radar image generation method.

BACKGROUND ART

A radar device used for a body check device is known. The body check device is disposed in a place where security check of entering and leaving people is required, such as an airport, a railroad station, or a port. A body check device using a radar device is a device that images a subject by transmitting, for example, a millimeter-waveband radio wave from the radar device and receiving a reflected wave of the radio wave reflected by the subject. Since the milli-meter-waveband radio wave passes through clothes of a person and has a small radiation amount to the person, the body check device using the millimeter-waveband radio wave can identify metal and non-metal prohibited articles.

There are two types of conventional body check devices that use millimeter-waveband radio waves: one in which the subject needs to be stationary and one in which the subject does not need to be stationary. However, from the viewpoint of improving the efficiency of the body check, there is an increasing demand for a body check device for which a subject does not need to be stopped than a body check device for which a subject needs to be stopped.

For example, Non-Patent Literature 1 describes a radar device that performs three-dimensional millimeter wave imaging by transmitting millimeter waves in a time division manner from a plurality of transmission antennas and receiv-ing reflected waves of the millimeter waves by a two-dimensional reception array while a subject moves at a constant speed.

CITATION LIST

Non-Patent Literature

Non-Patent Literature 1: Borja Gonzalez-Valdes et al., "Millimeter wave imaging architecture for on-the-move whole body imaging," IEEE Trans. Ant. Propag., vol. 64, no 5, May 2016.

SUMMARY OF INVENTION

Technical Problem

The radar device described in Non Patent Literature 1 adopts a time division multiplex-multiple input multiple output (TDM-MIMO) system for switching transmission antennas in a time division manner in order to widen a virtual aperture using a plurality of transmission antennas. In the radar device of the TDM-MIMO system, when the subject moves while the transmission antennas are switched, the reception signals of the reflected waves of the radio waves transmitted from different transmission antennas can-not be coherently added. As a result, there is a problem that blurring occurs in a three-dimensional imaging image (three-dimensional radar image) and a high-resolution image cannot be generated.

The present disclosure solves the above problem, and an object thereof is to obtain a radar device and a radar image generation method capable of improving resolution of a three-dimensional radar image.

Solution to Problem

A radar device according to the present disclosure includes: a transmitter to transmit transmission signals to space by using a plurality of transmission antennas arranged linearly; a receptor to receive reflected signals that are the transmission signals reflected in the space by using a plu-rality of reception antennas linearly arranged in the same direction as a plurality of the transmission antennas, and acquire digital data of the received signals; a controller to cause the transmitter and the receptor to repeatedly execute a series of processing in which the transmitter simultane-ously transmits the transmission signals from a plurality of the transmission antennas and the receptor receives the reflected signals by a plurality of the reception antennas and acquires the digital data; and a signal processor to generate a three-dimensional radar image of a detection object moved in a direction crossing an antenna arrangement direction of a plurality of the transmission antennas and a plurality of the reception antennas by using the digital data sequentially acquired in the series of processing repeatedly executed as two-dimensional array data wherein at least one of a plurality of the transmission antennas is disposed at a first end of a substrate and a second end facing the first end, wherein the controller sets a pulse repetition interval of the transmission signals simulta-neously transmitted from a plurality of the transmission antennas to be constant, and sets an initial phase change amount between the transmission signals at the pulse repetition interval to a different value for each of the transmission antennas, wherein the transmitter simul-taneously transmits the transmission signals having initial phase change amounts different for each of the transmission antennas from a plurality of the transmis-sion antennas and multiplexes the transmission signals on a Doppler frequency axis, and the signal processor generates two dimensional frequency signals by performing one dimensional Fourier trans-form on a plurality of reception signals which are reflected signals sequentially received in the pulse repetition intervals by the reception antenna, generates three dimensional frequency signals by performing three dimensional Fourier transform on the plurality of reception signals parallel to generating the two dimen-sional frequency signals, generates signals of the three-dimensional radar image of the detection object for each of the transmission antennas using the two dimen-sional frequency signals and the tree dimensional fre-quency signals generated in parallel and generates a final three-dimensional radar image of the detection object by coherently adding signals of the three-dimen-sional radar image generated for each of the transmis-sion antennas.

Advantageous Effects of Invention

According to the present disclosure, a transmission unit and a reception unit are caused to repeatedly execute a series of processing in which the transmission unit transmits transmission signals to space using a plurality of transmission antennas arranged linearly, the reception unit receives reflected signals that are the transmission signals reflected in space using a plurality of reception antennas arranged linearly in the same direction as the plurality of transmission antennas, the transmission signals are simultaneously transmitted from the plurality of transmission antennas, the reflected signals are received by the plurality of reception antennas, and digital data is acquired. By using digital data sequentially acquired by a series of processing repeatedly executed as two-dimensional array data, a three-dimensional radar image of a detection object moved in a direction crossing an antenna arrangement direction of a plurality of transmission antennas and a plurality of reception antennas is generated. As a result, the signal transmission interval of the transmission antenna is shortened, the influence of the movement of the detection object within the time of the signal transmission interval is reduced, and the reception signals derived from the transmission signals from different transmission antennas can be coherently added, so that the radar device according to the present disclosure can enhance the resolution of the three-dimensional radar image.

BRIEF DESCRIPTION OF DRAWINGS

FIG. 9 is a flowchart illustrating a radar image generation method according to the first embodiment.

FIG. 16 is a flowchart illustrating a radar image generation method according to the second embodiment.

DESCRIPTION OF EMBODIMENTS

In the following description, a case where a frequency modulated continuous wave (FMCW) radar device is used will be exemplified. However, instead of the FMCW radar device, a pulse radar device or a step frequency continuous wave (SFCW) radar device may be used.

First Embodiment

Figure 1:
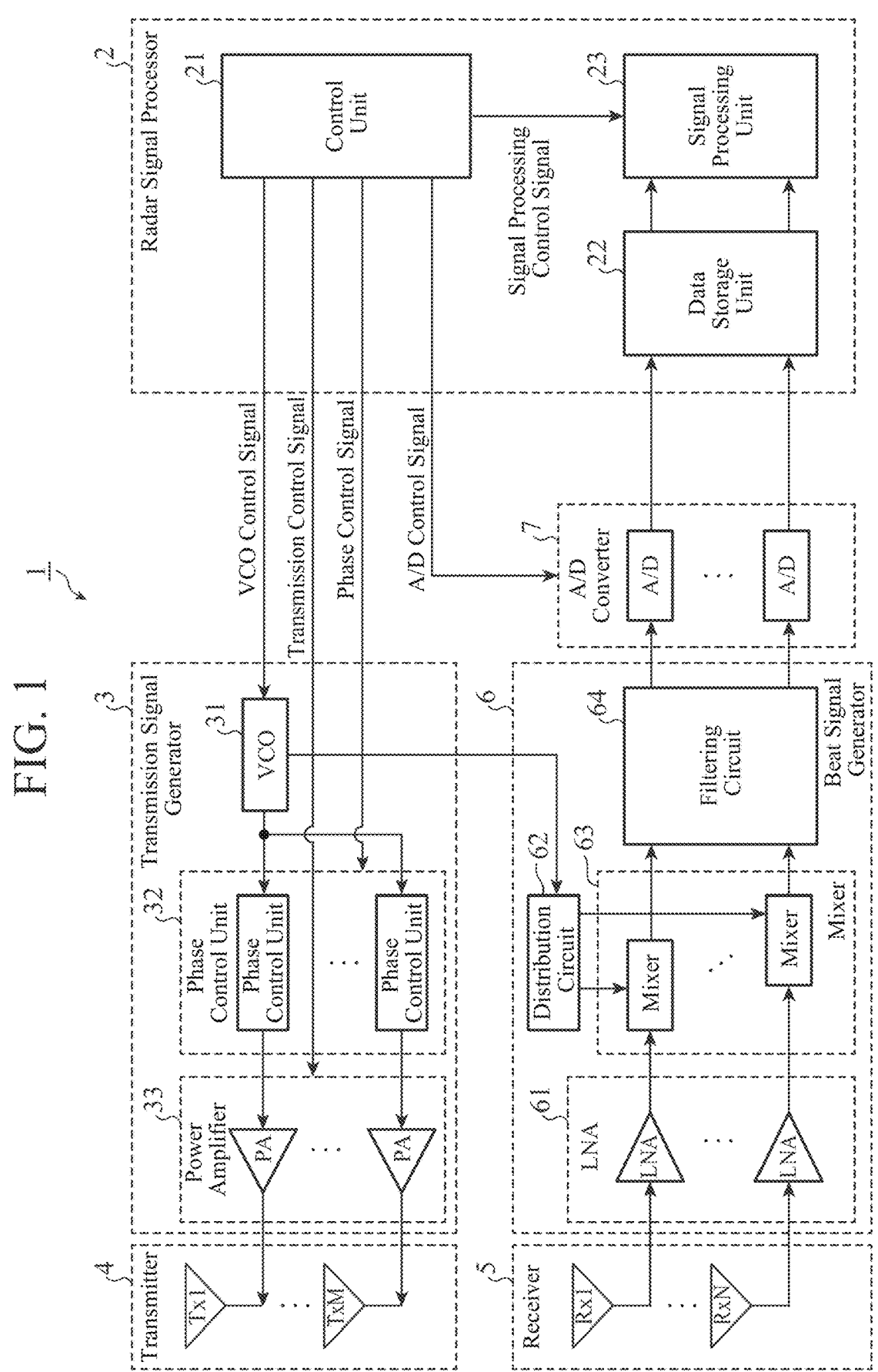
FIG. 1 is a block diagram showing a configuration of a radar device according to a first embodiment.

FIG. 1 is a block diagram illustrating a configuration of a radar device 1 according to a first embodiment, and illustrates an FMCW radar device. The radar device 1 uses a one-dimensional array antenna to transmit a transmission signal as a radio wave to space, and receives a reflected wave that is the transmitted radio wave reflected by a detection object existing in space and returned, thereby generating a three-dimensional radar image of the detection object. The radar device 1 includes a radar signal processor 2, a transmission signal generator 3, a transmitter 4, a receiver 5, a beat signal generator 6, and an A/D converter 7. The transmitter 4 includes M transmission antennas Tx1 to TxM, and the receiver 5 includes N reception antennas Rx1 to RxN.

The radar signal processor 2 controls the transmission signal generator 3 to transmit a transmission signal, and generates a three-dimensional radar image by performing signal processing on a reception signal of a reflected signal that is the reflected transmission signal. The transmission signal generator 3 is controlled by the radar signal processor 2 to generate a transmission signal, and outputs the transmission signal to the transmitter 4. The transmitter 4 transmits the transmission signal output from the transmission signal generator 3 to a space using the M transmission antennas Tx1 to TxM. The transmission signal generator 3 and the transmitter 4 function as a transmission unit that transmits a transmission signal to space.

The receiver 5 receives the reflected signal that is the transmission signal reflected in the space and returned to the radar device 1 side using the N reception antennas Rx1 to RxN. The beat signal generator 6 generates a beat signal which is an intermediate frequency signal (IF signal) by using the reception signal received by the receiver 5 and the transmission signal transmitted by the transmitter 4, and outputs a beat signal obtained by filtering the generated beat signal to the A/D converter 7.

The A/D converter 7 is controlled by the radar signal processor 2 to perform analog/digital conversion on the beat signal output from the beat signal generator 6. For example, the A/D converter 7 generates digital data for each of the reception antennas by performing sampling at a preset sampling frequency and number of sampling points from the beat signal corresponding to each of the reception antennas Rx1 to RxN. The receiver 5, the beat signal generator 6, and the A/D converter 7 function as a reception unit that receives a reflected signal that is a transmission signal reflected in space.

The M transmission antennas Tx1 to TxM and the N reception antennas Rx1 to RxN constitute an array antenna (hereinafter, referred to as a one-dimensional array antenna). In the one-dimensional array antenna, the M transmission antennas Tx1 to TxM are linearly arranged, and the N reception antennas Rx1 to RxN are linearly arranged in the same direction as the transmission antennas.

The radar signal processor 2 includes a control unit 21, a data storage unit 22, and a signal processing unit 23. The control unit 21 causes the transmission unit and the reception unit to repeatedly execute a series of processing of simultaneously transmitting transmission signals from the M transmission antennas Tx1 to TxM, receiving reflected signals that are the reflected transmission signals by the reception antennas Rx1 to RxN, and acquiring digital data of the reception signals. For example, the control unit 21 controls a VCO 31, a phase control unit 32, a power amplifier 33, and the A/D converter 7 by outputting a VCO control signal, a phase control signal, a transmission control signal, an A/D control signal, and a signal processing control signal.

The data storage unit 22 stores digital data of a voltage value of each beat signal A/D converted by the A/D converter 7. Note that the data storage unit 22 may be a component included in a storage device provided separately from the radar signal processor 2. In this case, the radar signal processor 2 includes a control unit 21 and a signal processing unit 23, and the signal processing unit 23 reads digital data of the voltage value of each beat signal from the data storage unit 22 provided in the storage device.

In accordance with the signal processing control signal, the signal processing unit 23 generates a three-dimensional radar image of the detection object by using, as two-dimensional array data, digital data sequentially acquired for the detection object that has moved in a direction crossing the antenna arrangement direction of the one-dimensional array antenna.

The transmission signal generator 3 includes the voltage controlled oscillator (VCO) 31, the phase control unit 32, and the power amplifier 33. The VCO 31 generates a transmission signal modulated so that the frequency changes in time in accordance with the VCO control signal output from the control unit 21, that is, the control voltage of the VCO 31. In addition, the VCO 31 outputs the generated transmission signal to the phase control unit 32 and the beat signal generator 6.

The phase control unit 32 sets any initial phase for each transmission channel to the transmission signal output from the VCO 31 in accordance with the phase control signal output from the control unit 21, and outputs the transmission signal for each transmission channel to which the initial phase is set to the power amplifier 33. The power amplifier 33 amplifies the transmission signal output for each transmission channel from the phase control unit 32 to a preset intensity according to the transmission control signal output from the control unit 21, and outputs the amplified transmission signal to the transmitter 4.

The transmitter 4 includes M transmission antennas Tx1 to TxM, and transmits the amplified transmission signal input from the power amplifier 33 to space as an electromagnetic wave using the transmission antennas Tx1 to TxM. The receiver 5 includes N reception antennas Rx1 to RxN, and receives the electromagnetic wave that is the electromagnetic wave transmitted by the transmitter 4, and reflected on the space side and returned, using the reception antennas Rx1 to RxN. Each reception antenna outputs the received electromagnetic wave to the beat signal generator 6 as a reception signal.

The beat signal generator 6 includes a low noise amplifier (LNA) 61, a distribution circuit 62, a mixer 63, and a filtering circuit 64. The LNA 61 amplifies the reception signal for each reception channel received by the reception antennas Rx1 to RxN. The distribution circuit 62 distributes the transmission signal output from the VCO 31 to the mixer 63 for each reception channel. The mixer 63 generates a beat signal for each reception channel by using the reception signal amplified for each reception channel and the transmission signal distributed for each reception channel by the distribution circuit 62, and outputs the beat signal to the filtering circuit 64.

The filtering circuit 64 includes a band pass filter (BPF) and an amplifier. The filtering circuit 64 filters the beat signal output from the mixer 63 for each reception channel, and outputs the filtered beat signal for each reception channel to the A/D converter 7. In each beat signal output to the A/D converter 7, a low frequency component and a high frequency component unnecessary for detection processing by the radar device 1 are suppressed, and the beat signal is amplified to a preset intensity by the amplifier.

The A/D converter 7 A/D-converts the voltage value of each beat signal output from the filtering circuit 64 in accordance with the A/D control signal output from the control unit 21, and outputs the A/D-converted signal to the radar signal processor 2. The digital data of the beat signal for each reception channel A/D-converted by the A/D converter 7 is stored in the data storage unit 22.

When the digital data of the reception signal corresponding to the transmission signal is stored in the data storage unit 22, the control unit 21 outputs a signal processing control signal to the signal processing unit 23. The signal processing unit 23 generates a three-dimensional image of the detection object (hereinafter, referred to as a target) by using the digital data stored in the data storage unit 22 in accordance with the signal processing control signal from the control unit 21.

Figure 2:
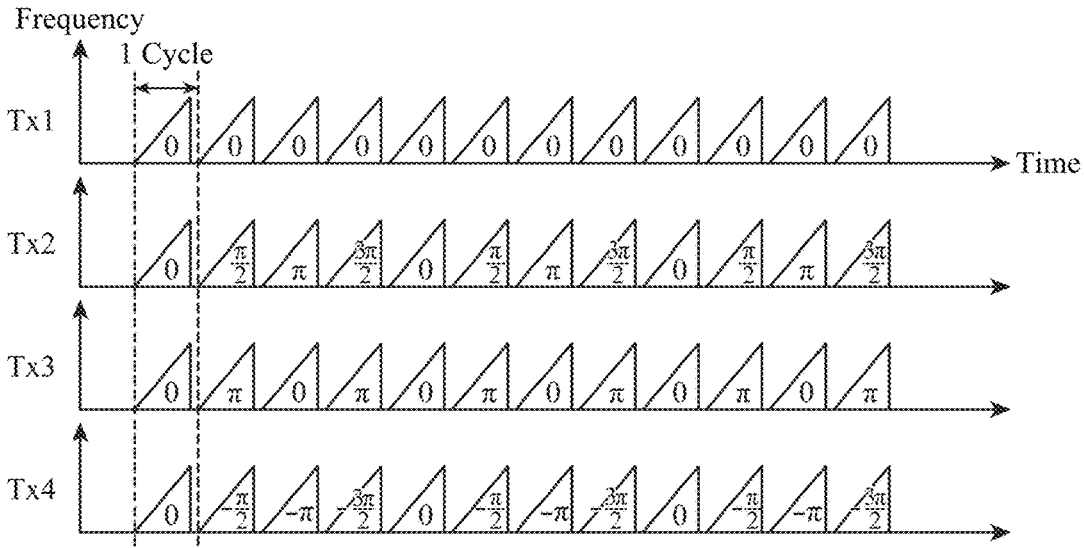
FIG. 2 is a waveform diagram illustrating modulation patterns of transmission signals transmitted from four transmission antennas included in a transmitter.

FIG. 2 is a waveform diagram illustrating modulation patterns of transmission signals transmitted from the four transmission antennas Tx1 to Tx4 included in the transmitter 4. In FIG. 2, the horizontal axis represents time, and the vertical axis represents frequency. The transmission antennas Tx1 to Tx4 have M=4, that is, four transmission antennas. Examples of the modulation pattern of the transmission signal include FMCW modulation using time-continuous up-chirp modulation. Hereinafter, the FMCW-modulated transmission signal is occasionally described as an FMCW signal.

The FMCW signals (chirp signals) transmitted by the four transmission antennas Tx1 to Tx4 are simultaneously transmitted at constant cycles. The phase rotation amount between the chirp signals of the initial phases of the chirp signals to be transmitted is set to be different for each of the transmission antennas by the phase control unit 32.

In FIG. 2, the phase rotation amount between the chirp signals in the transmission antenna Tx1 is 0 (rad), and the phase rotation amount between the chirp signals in the transmission antenna Tx2 is π/2 (rad). Further, the phase rotation amount between the chirp signals in the transmission antenna Tx3 is π(rad), and the phase rotation amount between the chirp signals in the transmission antenna Tx4 is −π/2 (rad). By changing the phase rotation amount between the chirp signals for each transmission antenna, a Doppler division multiplexing—multiple input multiple output (DDM-MIMO) system is implemented in the radar device 1.

Figure 3:
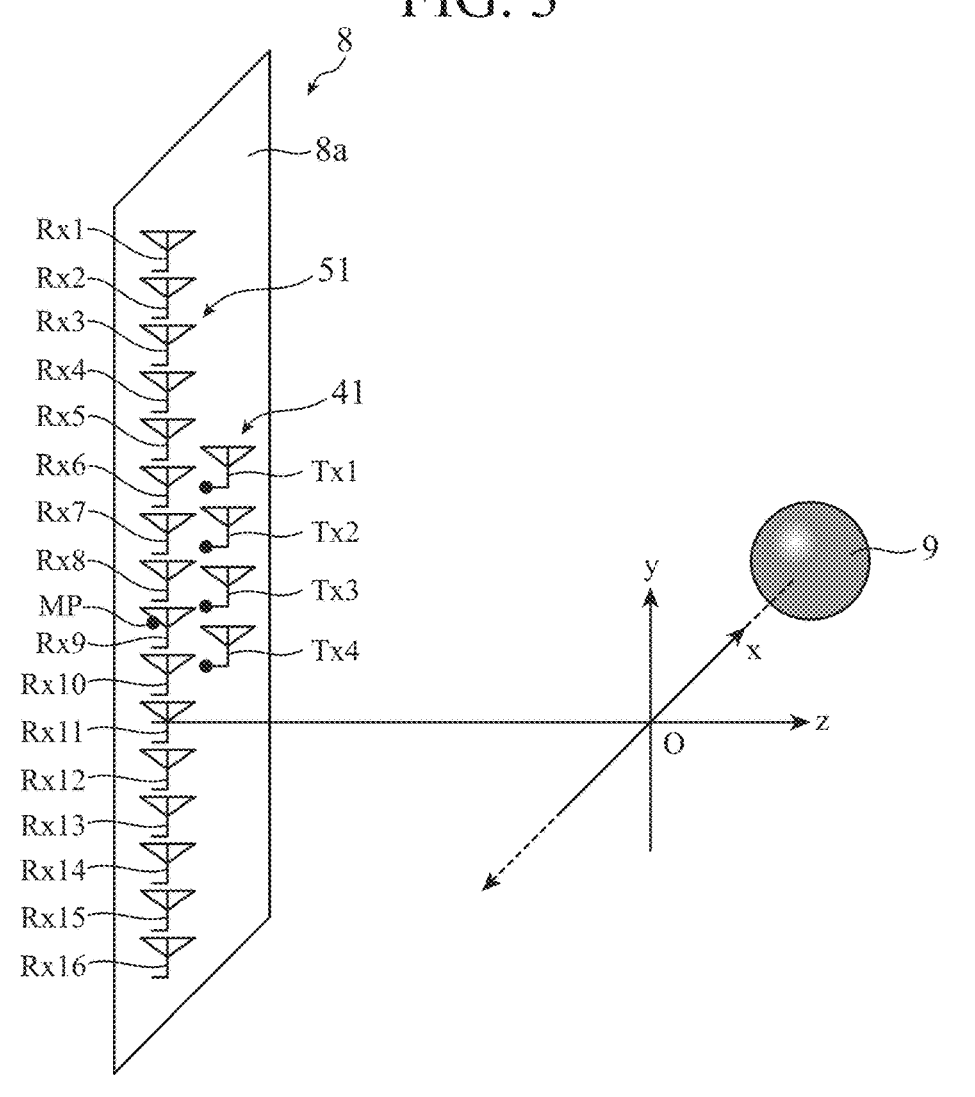
FIG. 3 is a schematic diagram illustrating a positional relationship between a one-dimensional array antenna and a target.

FIG. 3 is a schematic diagram illustrating a positional relationship between a one-dimensional array antenna 8 and a target 9. In FIG. 3, the one-dimensional array antenna 8 includes, for example, a substrate 8a, 4 (M=4) transmission antennas Tx1 to Tx4, and 16 (N=16) reception antennas Rx1 to Rx16. The substrate 8a is, for example, a rectangular substrate as illustrated in FIG. 3, and the longitudinal direction is disposed along the y direction in the xyz coordinate system of FIG. 3. Each of the transmission antennas Tx1 to Tx4 is fed with power via the substrate 8a, and the reception antennas Rx1 to Rx16 output reception signals to the receiver 5 via the substrate 8a.

The transmission antennas Tx1 to Tx4 constitute a transmission linear array 41 linearly arranged along the y direction on one surface of the substrate 8a. The position of the connection point at which the transmission antenna Txi (i=1 to 4) is connected to the substrate 8a is a coordinate $(\Delta x_{ti}, y_0+\Delta y_{ti}, z_0))$. That is, the position of the connection point at which the transmission antenna Tx1 is connected to the substrate 8a is the coordinates $(\Delta x_{t1}, y_0+\Delta y_{t1}, z_0)$. The position of the connection point at which the transmission antenna Tx2 is connected to the substrate 8a is at the coordinates $(\Delta x_{t2}, y_0+\Delta y_{t2}, z_0)$. The position of the connection point at which the transmission antenna Tx3 is connected to the substrate 8a is at the coordinates $(\Delta x_{t3}, y_0+\Delta y_{t3}, z_0)$. The position of the connection point at which the transmission antenna Tx4 is connected to the substrate 8a is at the coordinates $(\Delta x_{t4}, y_0+\Delta y_{t4}, z_0)$.

The 16 reception antennas Rx1 to Rx16 constitute a reception linear array 51 linearly arranged along the y direction on the one surface of the substrate 8a. The position of the center MP of the reception linear array 51 is at the coordinates $(0, y_0, z_0)$. The four transmission antennas Tx1 to Tx4 emit electromagnetic waves until a predetermined constant irradiation time elapses. In addition, it is assumed that the target 9 linearly moves at a constant velocity in the −x direction and passes through the coordinate origin O at an intermediate time of the irradiation time.

A transmission signal $s_{Tx1}(t)$ transmitted from the transmission antenna Tx1 can be expressed by the following formula (1). In the following formula (1), $f_0$ is a sweep start frequency, μ is a modulation slope, and $\varphi_0$ is an initial phase. T is a modulation time, and a relationship of 0≤t≤T is established.

$$s_{Tx1}(t) = \cos\left\{2\pi\left(f_0 t - \frac{\mu}{2}t^2\right) + \varphi_0\right\} \equiv \cos(\varphi(t)) \tag{1}$$

In a case where a reciprocating distance of the electromagnetic wave until the electromagnetic wave is emitted to the space by the transmission antenna Tx1, reflected by the point target existing in the space, and received by the reception antenna is 2R, a reception signal $s_{Rx}(t)$ of the reflected wave reflected by the point target and returned is expressed by the following formula (2). c is the speed of light.

$$s_{Rx}(t) = s_{Tx1}\left(t - \frac{2R}{c}\right) = \tag{2}$$
$$\cos\left[2\pi\left(f_0 t - \frac{\mu}{2}t^2\right) + 2\pi\left\{-\frac{2R}{c}f_0 - \frac{\mu}{2}\left(-\frac{4R}{c}t + \frac{4R^2}{c^2}\right)\right\} + \varphi_0\right]$$

The mixer 63 mixes the detected reception signal $S_{Rx}(t)$ and the transmission signal $S_{Tx1}(t)$ to generate a beat signal SIF (t) expressed by the following formula (3). where LPF[·] represents the low-pass filter processing in the filtering circuit 64, and j is an imaginary unit. $S_{Tx1+90\,deg}(t)$ is a signal obtained by advancing the phase of the transmission signal $S_{Tx1}(t)$ by 90 (deg). Although IQ detection is assumed, similar $s_{IF}(t)$ can be generated by Hilbert transform even in non-IQ detection.

$$s_{IF}(t) = LPF[s_{Rx}(t)s_{Tx1}(t) + j\,s_{Rx}(t)s_{Tx1+90deg}(t)] = \tag{3}$$
$$LPF[s_{Rx}(t)\cos(\varphi(t)) + j\,s_{Rx}(t)\sin(\varphi(t))] =$$
$$\exp\left(j2\pi\frac{2R\mu}{c}t\right)\exp\left\{-j2\pi\left(\frac{2R}{c}f_0 + \frac{2R^2\mu}{c^2}\right)\right\}$$

When the distance FFT processing is performed on the beat signal $S_{IF}(t)$, a pseudo time signal $S_{quasi}(\tau)$ expressed in the following formula (4), such as a reception signal of a pulse radar, is obtained. In the following formula (4), the beat signal $S_{IF}(t)$ is multiplied by exp {j2π(2Rμ/c)(T/2)} to rotate the phase.

$$s_{quasi}(\tau) = \int_{-\frac{T}{2}}^{\frac{T}{2}} s_{IF}(t)\exp\left(j2\pi\frac{2R\mu}{c}\frac{T}{2}\right)\exp(-j2\pi\tau t)dt = \tag{4}$$
$$\exp\left[-j2\pi\left\{\frac{2R}{c}f_c + \frac{2R^2\mu}{c^2}\right\}\right]T\mathrm{sinc}\left\{\left(\frac{2R\mu}{c} - \tau\right)T\right\}$$

The sinc function is defined by sinc $(x)=\sin(\pi x)/\pi x$. When the sampling frequency of the reception signal $S_{Rx}(t)$ is $F_s$, the range of the pseudo time $\tau$ is $-F_s/2 \leq \tau \leq F_s/2$. Since the extra phase term $\exp\{-j2\pi(2R^2\mu/c^2)\}$ related to the distance R exists in the pseudo time signal $S_{quasi}(\tau)$ as indicated by the above formula (4), the phase term is canceled by the phase correction processing using the following formula (5) to generate the phase corrected pseudo time signal $S_{quasi-comp}(\tau)$.

$$s_{quasi-comp}(\tau) = \tag{5}$$

$$s_{quasi}(\tau)\exp\left(j2\pi \cdot \frac{2R^2\mu}{c^2}\right) = \exp\left(-j2\pi \cdot \frac{2R}{c}f_c\right)T\mathrm{sinc}\left\{\left(\frac{2R\mu}{c} - \tau\right)T\right\}$$

When the distance FFT processing is performed on the phase-corrected pseudo time signal $S_{quasi-comp}(\tau)$, the spectrum S(f) converted into the frequency domain is calculated as expressed in the following formula (6). When the number of sampling of the reception signal $S_{Rx}(t)$ is N, the range of the frequency f is $-N/2F_s \leq f \leq N/2F_s$. The wave number k can be expressed by $k=2\pi(f_c+\mu f)/c$.

$$S(f) = \int_{-\frac{F_s}{2}}^{\frac{F_s}{2}} s_{quasi-comp}(\tau)\exp(-j2\pi f\tau)d\tau = \tag{6}$$

$$\exp\left(-j2 \cdot \frac{2\pi(f_c + \mu f)}{c}R\right) \equiv \exp(-j2kR)$$

In the above description, it is assumed that the target is a point target, but in practice, a spatially extended target is an imaging target. Therefore, the target is represented by a function g(x, y, z) representing the reflection intensity at each coordinate (x, y, z) in the three-dimensional space illustrated in FIG. 3. Also for the reciprocating distance 2R of the electromagnetic wave, it is necessary to correctly reflect each coordinate in the geometry illustrated in FIG. 3.

A spectrum S(x', y', k) of the reflected signal that is the transmission signal transmitted by the transmission antenna Tx1 and reflected by the target g(x, y, z) is expressed by the following formula (7). Note that x' is the x coordinate of the center position of the target when the transmission signal is transmitted, and y' corresponds to the value of the y coordinate $-y_0$ of the reception antenna that has received the reflected signal of the transmission signal. However, l(x', y') is represented by the following formula (8), $1_T(x')$ is represented by the following formula (9), and $1_R(x', y')$ is represented by the following formula (10).

$$S(x', y', k) = \int\int\int g(x, y, z)e^{-jkl(x',y')}dxdydz \tag{7}$$

$$l(x', y') = l_T(x') + l_R(x', y') \tag{8}$$

$$l_T(x') = \sqrt{(x - x' - \Delta x_t)^2 + (y - y_0 - \Delta y_t)^2 + (z - z_0)^2} \tag{9}$$

$$l_R(x', y') = \sqrt{(x - x')^2 + (y - y' - y_0)^2 + (z - z_0)^2} \tag{10}$$

When the frequency signal obtained by two-dimensional Fourier transforming the spectrum S(x', y', k) with respect to x' and y' is S($k_x$, $k_y$, k), the target g(x, y, z) is estimated using the following formula (11). The derivation will be separately described later.

$$g(x, y, z) \approx \tag{11}$$

$$\int\int\int Stolt\Big[S(k_x, k_y, k) \cdot \exp\Big\{-j\Big(k_x\frac{\Delta x_t}{2} + k_y y_0 + k_z z_0\Big)\Big\} \cdot \exp$$

$$\{-j(k_{y,inc}(y_0 + \Delta y_t) + k_{z,inc}z_0)\} \cdot \exp\{j\Phi(k_x, k_y, k_z|y_{cnt}, z_{cnt})\}\Big] \cdot$$

$$\exp\{j(k_x x + k_y' y + k_z' z)\}dk_x dk_y' dk_z'$$

In the above formula (11), $k_y'$ is defined by the following formula (12), $k_z'$ is defined by the following formula (13), and $k_z$ is defined by the following formula (14). $k_{y,inc}$ is defined by the following formula (15), and $k_{z,inc}$ is defined by the following formula (16). $k_{yz}$ is defined by the following formula (17). $\cos\theta_{inc}$ is defined by the following formula (18), and $\sin\theta_{inc}$ is defined by the following formula (19).

$$k_y' \triangleq k_y + k_{y,inc} \tag{12}$$

$$k_z' \triangleq k_z + k_{z,inc} \tag{13}$$

$$K_z \triangleq \sqrt{k_{yz}^2 - k_y^2} \tag{14}$$

$$k_{y,inc} \triangleq k_{yz}\cos\theta_{inc} \tag{15}$$

$$k_{z,inc} \triangleq k_{yz}\sin\theta_{inc} \tag{16}$$

$$k_{yz} \triangleq \sqrt{k^2 - (k_x/2)^2} \tag{17}$$

$$\cos\theta_{inc} \triangleq \frac{y_{cnt} - y_0 - \Delta y_t}{\sqrt{(y_{cnt} - y_0 - \Delta y_t)^2 + (z_{cnt} - z_0)^2}} \tag{18}$$

$$\sin\theta_{inc} \triangleq \frac{z_{cnt} - z_0}{\sqrt{(y_{cnt} - y_0 - \Delta y_t)^2 + (z_{cnt} - z_0)^2}} \tag{19}$$

$\Phi$ in the above formula (11) is defined by the following formula (20). Here, $R_1$ is defined by the following formula (21), and $R_2$ is defined by the following formula (22).

$$\Phi(k_x, k_y, k_z|y_{cnt}, z_{cnt}) \triangleq \tag{20}$$

$$\frac{k_{yz}^3 k_z^3}{2\{k_z^3 k^2 R_1 + k_{yz}^3(k^2 - k_y^2)R_2\}R_2}\Big(\Delta x_t + \frac{k_x}{2k_{yz}}R_1 - \frac{k_x}{2k_z}R_2\Big)^2$$

$$R_1 \triangleq \sqrt{(y_{cnt} - y_0 - \Delta y_t)^2 + (z_{cnt} - z_0)^2} \tag{21}$$

$$R_2 \triangleq z_{cnt} - z_0 \tag{22}$$

$\exp\{-j (k_x(\Delta x_t/2)+k_y y_0+k_z z_0)\}$ on the right side of the above formula (11) is a bulk compression function of the reception path. $\exp\{-j (k_{y,inc}(y_0+\Delta y_t)+k_{z,inc}z_0)\}$ on the right side of the above formula (11) is a bulk compression function of a transmission path approximated by a plane wave. $\exp\{j\Phi (k_x, k_y, k_z|y_{cnt},z_{cnt})\}$ on the right side of the above formula (11) is a bistatic arrangement correction term on the x-axis. The Stolt[·] function represents Stolt interpolation processing from ($k_x$, $k_y$, $k_z$) to ($k_x$, $k_y'$, $k_z'$).

The phase correction of the bulk compression function and the bistatic arrangement correction term described above is performed on the frequency signal S($k_x$, $k_y$, k). Thereafter, the coordinate system is resampled to an equidistant grid at ($k_x$, $k_y'$, $k_z'$) coordinates by Stolt interpolation, and then three-dimensional inverse FFT is performed to reproduce the target g(x, y, z).

Figure 4:
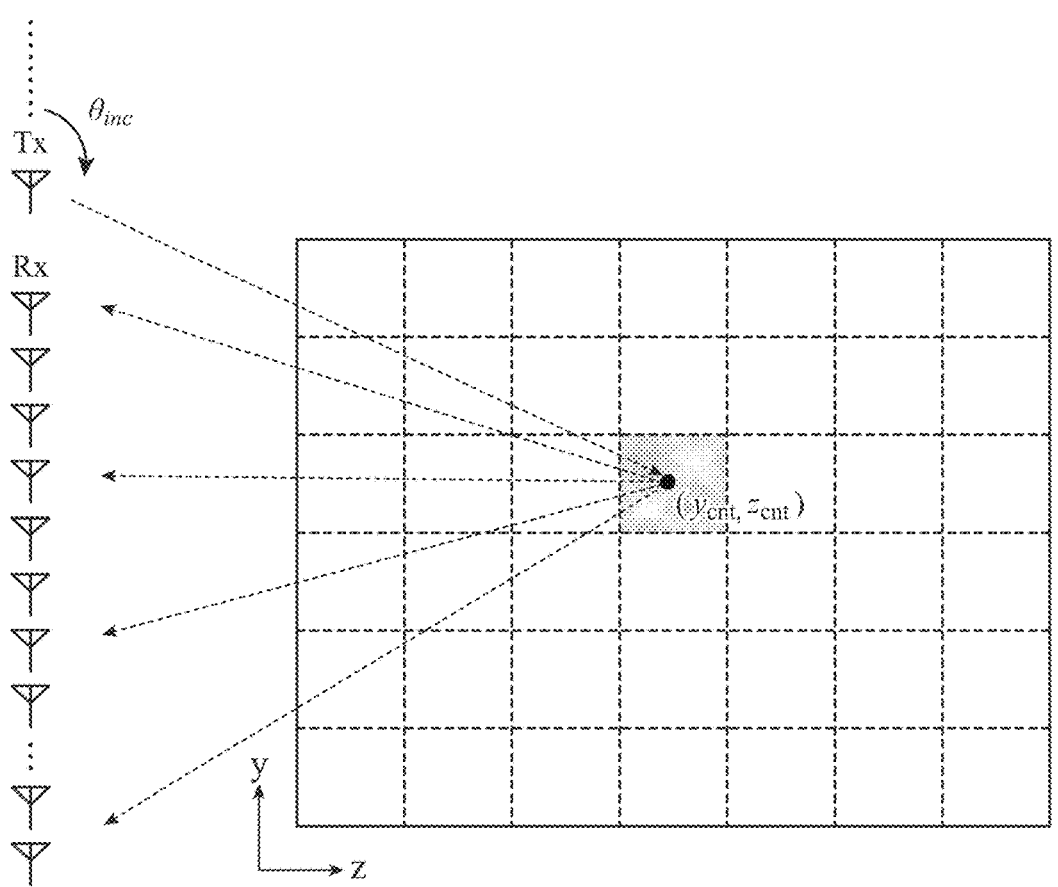
FIG. 4 is a y-z plan view illustrating an imaging target area.

The relational expression between $(k_x, k_y, k_z)$ and $(k_x, k_y', k_z')$ is as shown in the above formulas (12) to (19). FIG. 4 is a y-z plan view illustrating an imaging target area. The relational expression between $(k_x, k_y, k_z)$ and $(k_x, k_y', k_z')$ depends on the approximate coordinate center $(y_{cnt}, z_{cnt})$ on the y-z plane when the transmission path is approximated by a plane wave. In this case, as illustrated in FIG. 4, it is necessary to two-dimensionally divide the imaging target area into fine cells that can be approximated by plane waves in the y-z plane, and perform image reproduction for each xyz three-dimensional area corresponding to each cell (mosaic polar format). In the above formulas (15), (16), (18), and (19), $\theta_{ino}$ corresponds to an angle subtended from the +y direction to the center of each cell.

The above formulas (20) to (22) are bistatic arrangement correction terms, and also in these formulas, the value of the center $(y_{cnt}, z_{cnt})$ of each cell illustrated in FIG. 4 is used as a representative value of $(y,z)$. These correction terms are terms for correcting an extra phase rotation caused by position offsets of the transmission linear array 41 and the reception linear array 51 in the x-axis direction.

Figure 5:
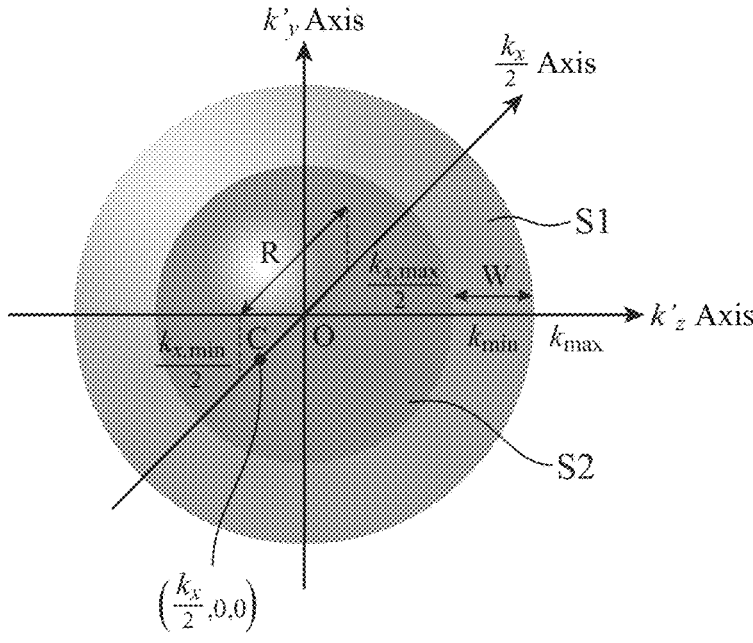
FIG. 5 is an image diagram illustrating a three-dimensional sphere centered on an origin O with an upper limit value $k_{max}$ of a wave number k determined by a transmission frequency band as a radius and a three-dimensional sphere centered on the origin O with a lower limit value $k_{min}$ as a radius in a three-dimensional wave number space.

Furthermore, a geometric image of the relational expression between $(k_x, k_y, k_z)$ and $(k_x, k_y', k_z')$ expressed by the above formulas (12) to (19) will be described. FIG. 5 is an image diagram illustrating a three-dimensional sphere S1 centered on the origin O with an upper limit value $k_{max}$ of the wave number k determined by the transmission frequency band as a radius and a three-dimensional sphere S2 centered on the origin O with a lower limit value $k_{min}$ as a radius in the three-dimensional wave number space. W is a bandwidth of the wave number k.

In the $k_x/2$ axis, signal support is limited to a specific range. For example, assuming that the half-value width of 3 dB of the antenna element directivity in the x direction (azimuth direction) illustrated in FIG. 3 is $\pm\theta_{3dB}$ and a signal is obtained only in this range, the support range of the wave number $k_x$ is limited by $k_x \in [k_{x,min}, k_{x,max}] = [-k_{max} \sin \theta_{3dB}, k_{max} \sin \theta_{3dB}]$. In FIG. 5, this support range is drawn by an arrow R parallel to the $k_x/2$ axis.

Figure 6:
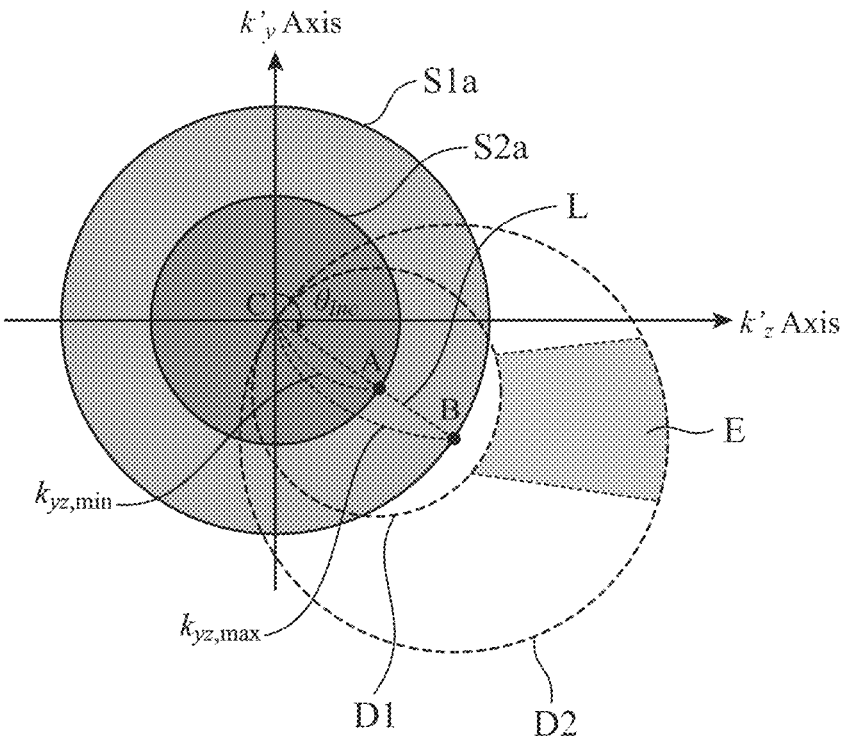
FIG. 6 is an image diagram illustrating a cross section of two three-dimensional spheres that pass through a point C corresponding to a wave number $k_x$ in FIG. 5 and are parallel to a $k_y'$-$k_z'$ plane.

FIG. 6 is an image diagram illustrating a cross section of two three-dimensional spheres that pass through a point C corresponding to a wave number $k_x$, in FIG. 5 and are parallel to a $k_y'$-$k_z'$ plane. The cross section S1$a$ is a cross section of a three-dimensional sphere S1 that passes through a point C $(k_x/2,0,0)$ corresponding to the wave number $k_x$ in the support range and is parallel to the $k_y'$-$k_z'$ plane. The cross section S2$a$ is a cross section of a three-dimensional sphere S2 that passes through the point C $(k_x/2,0,0)$ and is parallel to the $k_y'$-$k_z'$ plane.

As illustrated in FIG. 6, an angle with respect to the +$k_y'$ direction is $\theta_{inc}$, and an intersection of a straight line L extending from the point C toward each outer peripheral side of the cross sections S1$a$ and S2$a$ and an outer peripheral circle of the cross section S2$a$ is A, and an intersection of the straight line L and the outer peripheral circle of the cross section S1$a$ is B. As a result, a circle D1 passing through the point C about the intersection A and a circle D2 passing through the point C about the intersection B are defined.

The radius of the circle D1 is a distance $k_{yz,min}$ between the point C and the intersection A, and the radius of the circle D2 is a distance $k_{yz,max}$ between the point C and the intersection B. Among the regions on the outer peripheral side of the circle D1 and on the inner peripheral side of the circle D2, a region E extending in a fan shape in the $k_x/2$ axis direction is a frequency domain support on the $k_y'$-$k_z'$ plane with respect to the wave number $k_x$.

Figure 7:
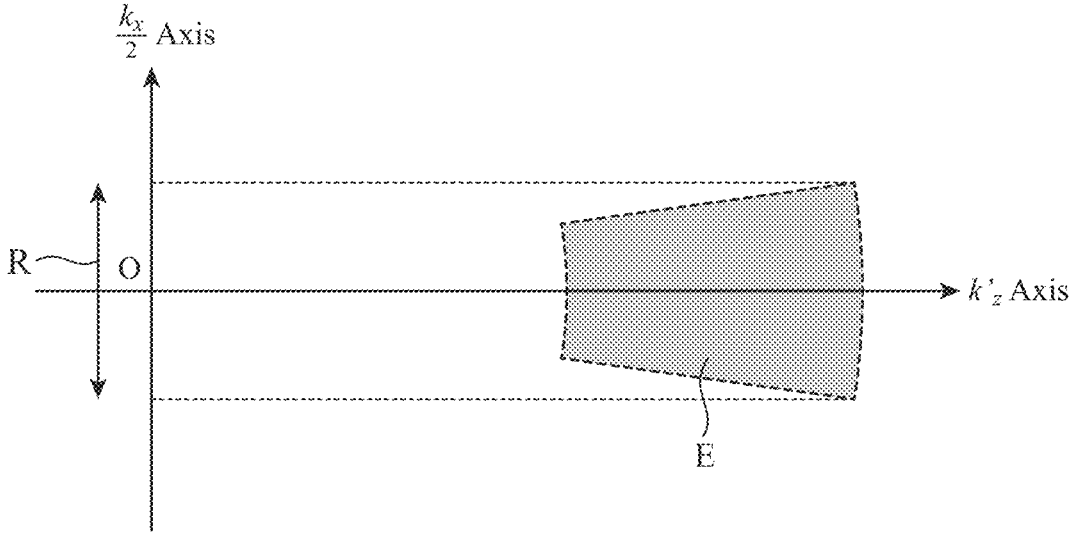
FIG. 7 is an image diagram illustrating a frequency domain in a $k_y'$-$k_z'$ plane regarding a wave number $k_x$.

FIG. 7 is an image diagram illustrating a frequency domain in a $k_y'$-$k_z'$ plane regarding a wave number $k_x$. As illustrated in FIG. 7, the fan-shaped region E is limited in a range of $k_x/2 \in [k_{x,min}/2, k_{x,max}/2] = [-(k_{max}/2) \sin \theta_{3dB}, (k_{max}/2) \sin \theta_{3dB}]$ in the $k_x/2$-axis direction. This means that there is a possibility that the transmission signal can be multiplexed to implement MIMO by utilizing the $k_x/2$-axis direction, that is, the vacant frequency region of the Doppler frequency axis.

In order to multiplex signals on the Doppler frequency axis, the transmission signals transmitted by the transmission antennas may be supported by different shift amounts on the Doppler frequency axis. In order to implement this, different initial phase change amounts may be set for different chirps for transmission signals transmitted by different transmission antennas.

In a case where an initial phase change amount while the target moves by a unit distance is a (rad/m), a reflected signal S(x',y',k) that is obtained by reflection of the transmission signal at a spatially extended target g(x,y,z) is expressed by the following formula (23). A difference from S(x',y',k) expressed by the above formula (7) is a portion in which the Green function is multiplied by $e^{-jax'}$. Note that in the following formula (23), $l(x',y')$ is expressed by the above formula (7), $1_T(x')$ is expressed by the above formula (9), and $1_R(x',y')$ is expressed by the above formula (10).

$$S(x', y', k) = \int\int\int g(x, y, z)e^{-j(kl(x',y')+ax')}dxdydz \quad (23)$$

The target g(x,y,z) is restored using the reflected signal S(x',y',k). For example, in the above formula (11) to the above formula (22), the target g(x,y,z) is expressed by the following formula (24) by changing the portion related to the wave number $k_x$, to the wave number $k_x'$. However, in the following formula (24), $k_x'$ is defined by the following formula (25), $k_y'$ is defined by the above formula (12), $k_z'$ is defined by the above formula (13), and $k_z$ is defined by the above formula (14). $k_{y,inc}$ is defined by the above formula (15), and $k_{z,inc}$ is defined by the above formula (16). $k_{yz}$ is defined by the following formula (26). $\cos \theta_{inc}$ is defined by the above formula (18), and $\sin \theta_{inc}$ is defined by the above formula (19).

$$g(x, y, z) \approx \quad (24)$$
$$\int\int\int Stolt\left[S(k_x, k_y, k_z) \cdot \exp\left\{-j\left(k_x'\frac{\Delta x_t}{2} + k_y y_0 + k_z z_0\right)\right\} \cdot \exp \right.$$
$$\left. \{-j(k_{y,inc}(y_0 + \Delta y_t) + k_{z,inc}z_0)\} \cdot \exp\{j\Phi(k_x', k_y, k_z|y_{cnt}, z_{cnt})\}\right] \cdot$$
$$\exp\{j(k_x'x + k_y'y + k_z'z)\}dk_x'dk_y'dk_z'$$

$$k_x' \triangleq k_x + a \quad (25)$$

$$k_{yz} \triangleq \sqrt{k^2 - (k_x'/2)^2} \quad (26)$$

$\Phi$ in the above formula (24) is expressed by the following formula (27). $R_1$ is defined by the above formula (21), and $R_2$ is defined by the above formula (22).

$$\triangleq \frac{k_{yz}^3 k_z^3}{2\{k_z^3 k^2 R_1 + k_{yz}^3(k^2 - k_y^2)R_2\}}\left(\Delta x_t + \frac{k_x'}{2k_{yz}}R_1 - \frac{k_x'}{2k_z}R_2\right)^2 \quad (27)$$

In the following formula (24), the Stolt[·] function represents Stolt interpolation processing from $(k_x, k_y, k_z)$ to $(k_x', k_y', k_z')$. The above formulas (24) to (27) mean that the three-dimensional support is shifted by the initial phase change amount a (rad/m) on the Doppler frequency axis.

Figure 8:
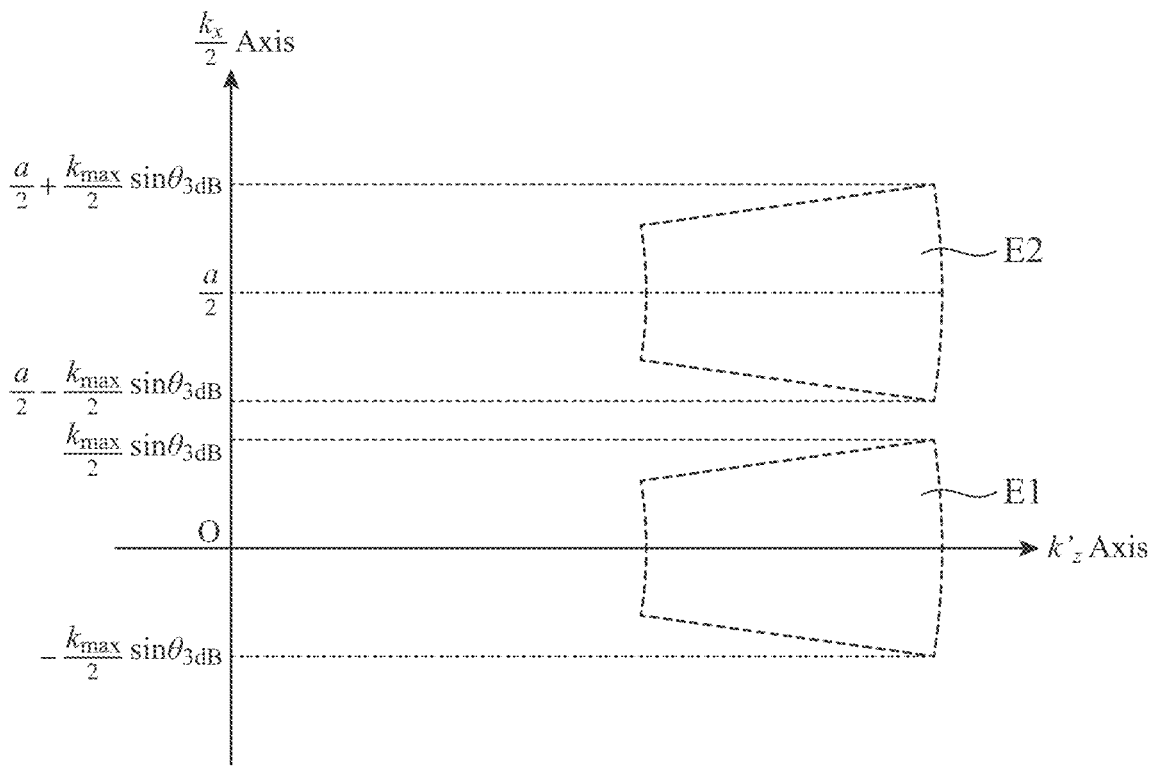
FIG. 8 is an image diagram illustrating a frequency domain in a $k_y'$-$k_z'$ plane regarding a wave number $k_x$ obtained by two transmission antennas.

FIG. 8 is an image diagram illustrating a frequency region in the $k_y'$-$k_z'$ plane regarding the wave number $k_x$ obtained by the transmission antenna Tx1 and the transmission antenna Tx2. Among the transmission antenna Tx1 and the transmission antenna Tx2, when the transmission antenna Tx1 does not change the initial phase between the chirps and the transmission antenna Tx2 changes the initial phase between the chirps by the initial phase change amount a (rad/m), the frequency support is fan-shaped regions E1 and E2 illustrated in FIG. 8 in the two-dimensional plane of $k_y/2$-$k_z'$. As described above, in a case where different initial phase change amounts are given for each transmission antennas at the time of simultaneous transmission from the plurality of transmission antennas, the signals transmitted by each transmission antennas are separated on the Doppler frequency axis, and DDM-MIMO can be implemented.

As illustrated in FIG. 8, in order to cleanly separate the signal transmitted by the transmission antenna Tx1 and the signal transmitted by the transmission antenna Tx2 on the Doppler frequency axis, it is necessary to satisfy the following relational expression (28).

$$2k_{max} \sin \theta_{3dB} < a \qquad (28)$$

For example, in a case where the initial phase set to the signal transmitted by the transmission antenna Tx2 is rotated by $\varphi$(rad) between chirps, the speed of movement of the target along the x direction is v (m/s), and the chirp interval is T (s), the initial phase change amount a (rad/m) is expressed by the following formula (29).

$$a = \frac{\varphi}{vT} \qquad (29)$$

In order to implement DDM-MIMO in the radar signal processor 2, it is necessary to satisfy the following relational expression (30) regarding the phase rotation amount $\varphi$[rad] between chirps.

$$2vTk_{max} \sin \theta_{3dB} < \varphi \qquad (30)$$

In the geometry illustrated in FIG. 3, the initial phases of the chirp sequence of the signals transmitted from each transmission antennas Tx1 to Tx4 are changed as illustrated in FIG. 2 while satisfying the condition that the frequency supports of the signals transmitted from each four transmission antennas Tx1 to Tx4 do not overlap with each other. As a result, four-transmission DDM-MIMO is implemented.

Next, details of four-transmission DDM-MIMO processing by the radar signal processor 2 are as follows. FIG. 9 is a flowchart illustrating the radar image generation method according to the first embodiment, and illustrates generation of a three-dimensional radar image of a target using four-transmission DDM-MIMO processing in the geometry of FIG. 2.

As a premise of the processing of FIG. 9, the control unit 21 controls to cause the transmission unit and the reception unit to repeat a series of processing of simultaneously transmitting transmission signals from the four transmission antennas Tx1 to Tx4, receiving reflected signals that are the reflected transmission signals by the reception antennas Rx, and acquiring digital data of the reception signals. The signal processing unit 23 regards digital data sequentially acquired for the target 9 that has moved across the antenna arrangement direction of the one-dimensional array antenna 8 as two-dimensional array data and performs inverse synthetic aperture processing. That is, a series of processing from step ST1 to step ST9 is inverse synthetic aperture processing, and a three-dimensional radar image of the target is generated by the inverse synthetic aperture processing.

The control unit 21 simultaneously transmits transmission signals having initial phase change amounts a different for each transmission antennas from the transmission antennas Tx1 to Tx4, thereby multiplexing the transmission signals on the Doppler frequency axis. The signal processing unit 23 generates a three-dimensional radar image of the target for each of the transmission antennas on the basis of the component of the reflected signal corresponding to the transmission signal for each transmission antennas, and adds the three-dimensional radar images for each transmission antennas to generate a final three-dimensional radar image of the target.

For example, the signal processing unit 23 generates the three-dimensional data $S(x', y', k)$ by performing the distance FFT on the time signal received by each reception antenna with respect to the reflected signal that is the transmission signal reflected at each movement position of the target moving along the x direction (step ST1). The signal processing unit 23 performs two-dimensional Fourier transform on the three-dimensional data $S(x', y', k)$ in the x' direction and the y' direction to generate $S(k_x, k_y, k)$ (step ST2). Since the signals transmitted by the four transmission antennas Tx1 to Tx4 are separated on the $k_x$ axis, the following processing from step ST3 to step ST8 is performed on the signals transmitted by each transmission antennas Tx1 to Tx4 independently of each other.

The signal processing unit 23 generates $S'(k_x, k_y, k)$ for each transmission antennas Tx1 to Tx4 by performing bulk compression processing of a reception path on $S(k_x, k_y, k)$ of each signals transmitted by the transmission antennas (step ST3). Thereafter, the processing from step ST4 to step ST7 requires plane wave approximation of the transmission signal. Therefore, these processing are performed independently in each two-dimensional space in the plurality of two-dimensional cells obtained by dividing the y-z space.

The signal processing unit 23 generates $S''(k_x, k_y, k | y_{cnt}, z_{cnt})$ by performing bulk compression of the transmission path on $S'(k_x, k_y, k)$ in the y-z space selected as the processing target among the y-z spaces of the plurality of two-dimensional cells (step ST4). Subsequently, the signal processing unit 23 performs bistatic arrangement correction on $S''(k_x, k_y, k | y_{cnt}, z_{cnt})$ to generate $S'''(k_x, k_y, k | y_{cnt}, z_{cnt})$ (step ST5).

Next, the signal processing unit 23 performs Stolt interpolation on $S'''(k_x, k_y, k | y_{cnt}, z_{cnt})$ to generate $S''''(k_x', k_y', k_z' | y_{cnt}, z_{cnt})$ (step ST6). The signal processing unit 23 performs three-dimensional inverse Fourier transform on $S''''(k_x', k_y', k_z' | y_{cnt}, z_{cnt})$ (step ST7). As a result, a three-dimensional radar image $g(x, y, z | y_{cnt}, z_{cnt})$ in the y-z space of the two-dimensional cell selected as the processing target is generated. Hereinafter, the three-dimensional radar image $g(x, y, z | y_{cnt}, z_{cnt})$ is occasionally described as a reproduced image $g(x, y, z | y_{cnt}, z_{cnt})$.

The signal processing unit 23 combines a plurality of reproduced images $g(x, y, z | y_{cnt}, z_{cnt})$ calculated for each two-dimensional cell obtained by dividing the y-z space (step ST8). As a result, the reproduced image g(x,y,z|Tx) corresponding to the transmission signal for each transmission antenna is generated. Next, the signal processing unit 23 coherently adds the reproduced images g(x,y,z|Tx) for each transmission antennas regarding all the transmission signals transmitted from the transmission antennas Tx1 to Tx4, and outputs the final reproduced image g(x,y,z) (step ST9).

In FIG. 9, the processing for each transmission antenna (steps ST3 to ST8) can be performed independently of each other. In addition, the processing (steps ST4 to ST7) for each y-z small cell space of the two-dimensional cell can also be processed independently of each other. These portions can be processed at high speed by parallel processing using a multi-core CPU or a GPU.

Figure 10:
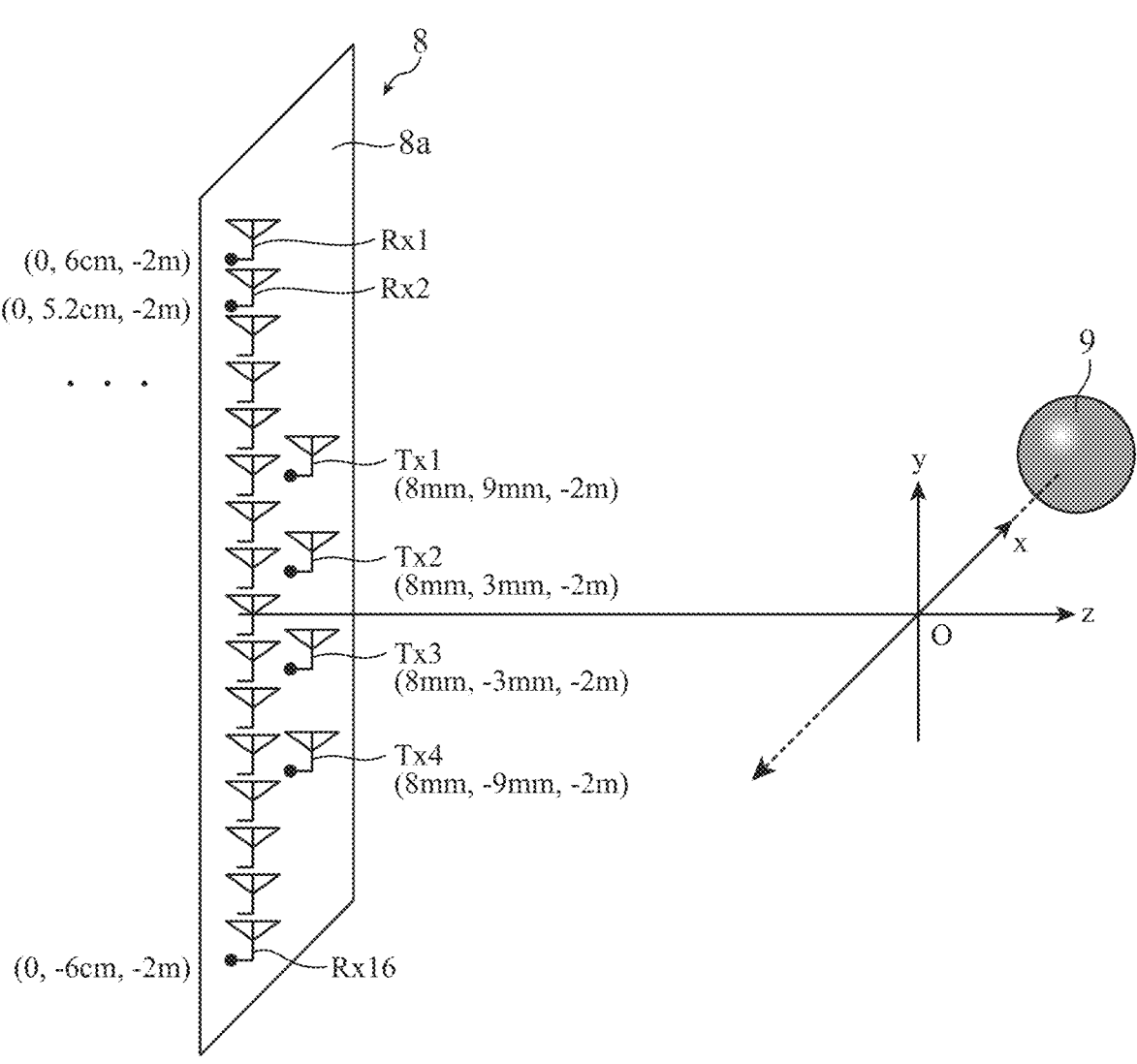
FIG. 10 is a schematic diagram illustrating an example of a positional relationship between a one-dimensional array antenna and a target.

FIG. 10 is a schematic diagram illustrating an example of a positional relationship between the one-dimensional array antenna 8 and the target 9. In the geometry illustrated in FIG. 10, the image reproduction result of the point target by the transmission antenna Tx1 is compared with the image reproduction result by 4-transmission DDM-MIMO using the transmission antennas Tx1 to Tx4. The movement of the target 9 is the same as that in FIG. 3, and the distance from the antenna surface of the substrate 8a to the movement trajectory of the target 9 is 2 (m).

The four transmission antennas Tx1 to Tx4 constitute a linear array arranged at equal intervals, and an interval between the transmission antennas is 6 (mm). Also in the 16 reception antennas Rx1, Rx2, and Rx16, a linear array in which the reception antennas are arranged at equal intervals is configured, and the interval between the reception antennas is 8 (mm). The one-dimensional array antenna 8 has a MIMO configuration of 4 transmission 16 reception, and is regarded as a virtual array having element antennas at intervals of 2 (mm) and a total aperture of about 12 (cm) when viewed from sufficiently afar.

The modulation method is linear FMCW modulation, and the frequency band is 77 to 81 (GHz). In addition, it is assumed that the horizontal directivity width of the transmission and reception antennas is ±13 (deg), and a signal from a wider angle range than that is not received. A change sequence of the initial phase for each chirp set to each transmission antenna is the same as that in FIG. 2.

Figure 11:
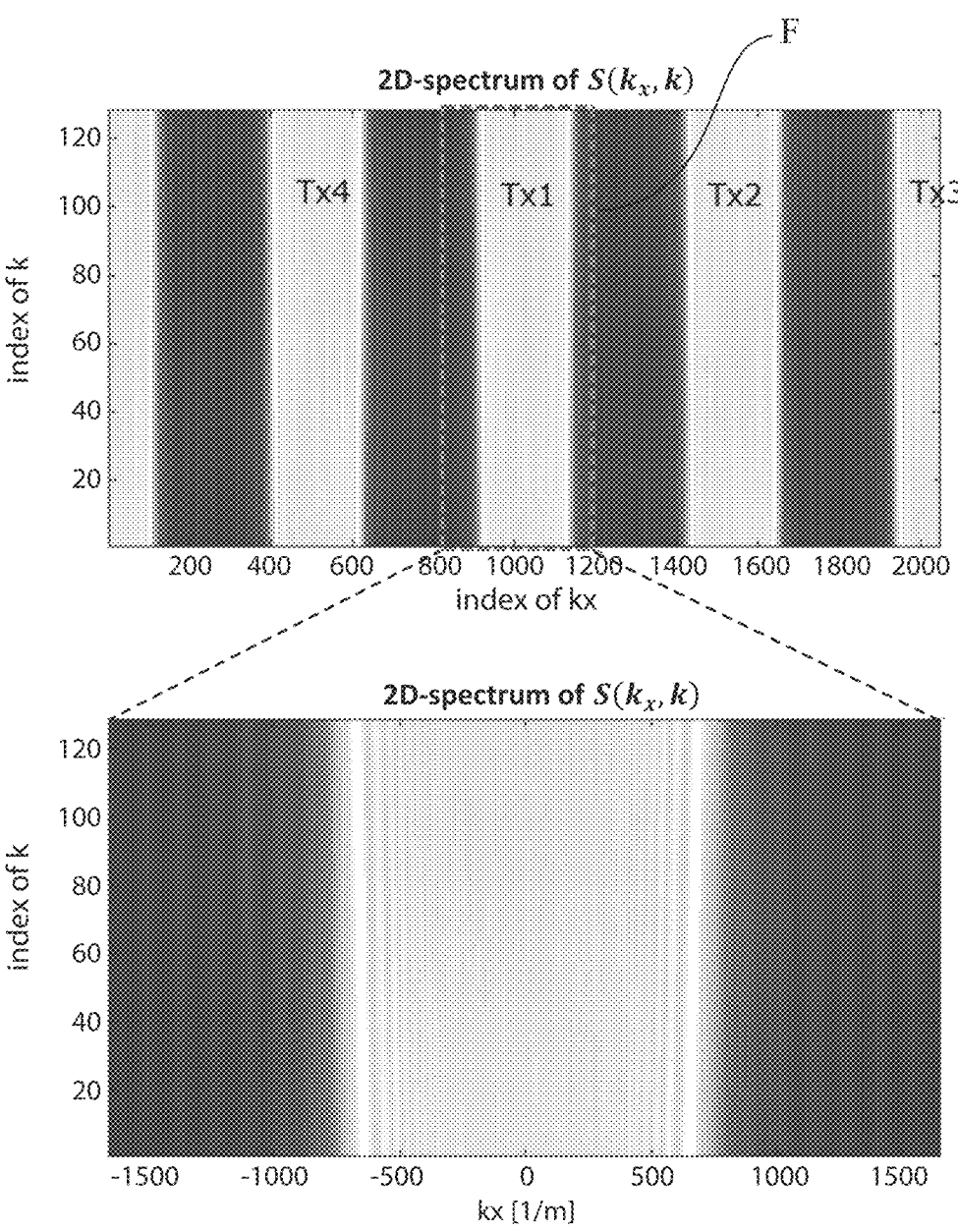
FIG. 11 is a spectrum diagram illustrating a two-dimensional spectrum in which a three-dimensional spectrum $S(k_x, k_y, k)$ is projected on a two-dimensional plane of $k_x$–k.

FIG. 11 is a spectrum diagram illustrating a two-dimensional spectrum in which a three-dimensional spectrum $S(k_x,k_y,k)$ is projected on a two-dimensional plane of $k_x$–k, and the lower diagram of FIG. 11 illustrates a spectrum portion to which a symbol F is assigned in the upper diagram. The two-dimensional spectrum in FIG. 11 is a two-dimensional spectrum obtained by fully projecting the three-dimensional spectrum $S(k_x,k_y,k)$ calculated by the signal processing unit 23 in step ST2 in FIG. 9 onto a two-dimensional plane of $k_x$–k. As illustrated in the upper part of FIG. 11, the signals transmitted from the transmission antennas Tx1 to Tx4 are separated for each transmission antenna on the $k_x$ axis, and four-transmission DDM-MIMO is implemented in the radar device 1. Furthermore, as illustrated in the lower part of FIG. 11, a two-dimensional spectrum corresponding to each transmission antenna is generated.

Figures 12A, 12B, 12C, 12D:
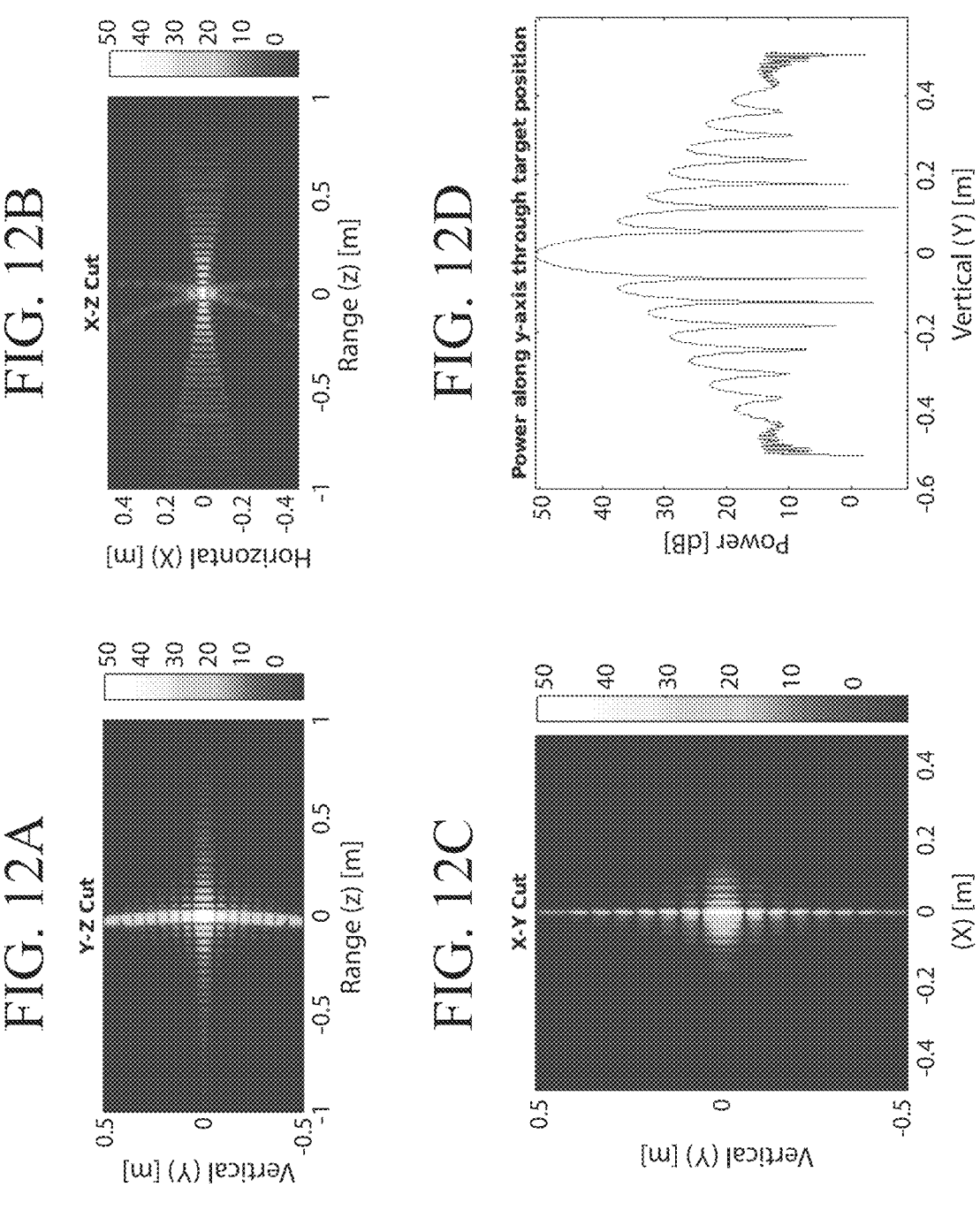
FIG. 12A is a cross-sectional view illustrating a cross section of an image intensity distribution calculated based on the reception signal derived from the transmission signal of the transmission antenna Tx1 taken along a y-z plane.
FIG. 12B is a view illustrating a cross section of the image intensity distribution of FIG. 12A taken along an x-z plane.
FIG. 12C is a cross-sectional view illustrating a cross section of the image intensity distribution of FIG. 12A taken along an x-y plane.
FIG. 12D is a distribution diagram illustrating the image intensity distribution of FIG. 12A on a straight line passing through a target position and along a y axis.

FIG. 12A is a cross-sectional view illustrating a cross section obtained by cutting an image intensity distribution calculated based on the reception signal derived from the transmission signal of the transmission antenna Tx1 along the y-z plane. The image intensity distribution illustrated in FIG. 12A is a reproduction result of the three-dimensional radar image. FIG. 12B is a view illustrating a cross section of the image intensity distribution of FIG. 12A taken along an x-z plane. FIG. 12C is a cross-sectional view illustrating a cross section of the image intensity distribution of FIG. 12A taken along an x-y plane. FIG. 12D is a distribution diagram illustrating the image intensity distribution of FIG. 12A on a straight line passing through the target position and along the y axis.

Figures 13A, 13B, 13C, 13D:
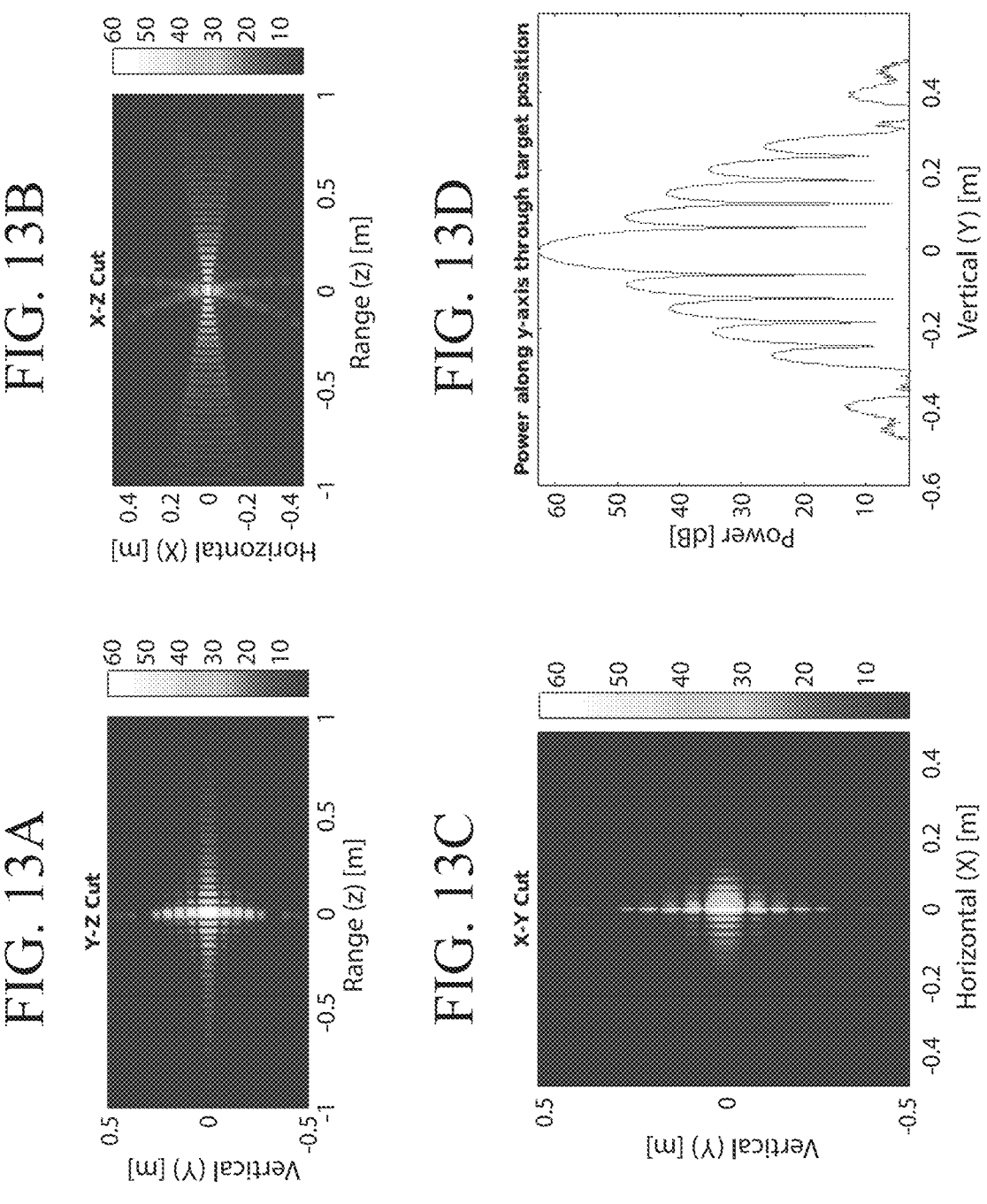
FIG. 13A is a cross-sectional view illustrating a cross section of an image intensity distribution calculated based on reception signals derived from transmission signals of transmission antennas Tx1 to Tx4 taken along a y-z plane.
FIG. 13B is a view illustrating a cross section of the image intensity distribution of FIG. 13A taken along an x-z plane.
FIG. 13C is a cross-sectional view illustrating a cross section of the image intensity distribution of FIG. 13A taken along an x-y plane.
FIG. 13D is a distribution diagram illustrating the image intensity distribution of FIG. 13A on a straight line passing through a target position and along a y axis.

FIG. 13A is a cross-sectional view illustrating a cross section of the image intensity distribution calculated based on the reception signals derived from the transmission signals of the transmission antennas Tx1 to Tx4 taken along the y-z plane. FIG. 13B is a view illustrating a cross section of the image intensity distribution of FIG. 13A taken along the x-z plane. FIG. 13C is a cross-sectional view illustrating a cross section of the image intensity distribution of FIG. 13A taken along the x-y plane. FIG. 13D is a distribution diagram illustrating the image intensity distribution of FIG. 13A on a straight line passing through the target position and along the y axis.

As is clear from FIGS. 12A, 12B, 12C, and 12D and FIGS. 13A, 13B, 13C, and 13D, the peak power is improved by about 12 dB ($=20 \log_{10} 4$) as compared with the image intensity distribution calculated based on the reception signal derived from the transmission signal of the transmission antenna Tx1 by coherently adding the image intensity distributions calculated for each transmission antennas on the basis of the reception signals derived from all the signals transmitted from the transmission antennas Tx1 to Tx4. This means that the SN ratio is improved by the multiple of number of transmission antennas ($=4$ times). The integrated side lobe ratio (ISLR) is also improved by about 4 dB.

In the odometry illustrated in FIG. 10, since it is MIMO, the total aperture does not change. Therefore, the resolution of the three-dimensional radar image generated by the radar device 1 does not change.

In the one-dimensional array antenna 8, it is possible to improve the resolution of the three-dimensional radar image by arranging the transmission antennas and the reception antennas in such a manner that the total aperture is widened while increasing the interval between the element antennas (MIMO virtual array interval).

A hardware configuration for implementing the functions of the radar signal processor 2 is as follows.

Figure 14A:
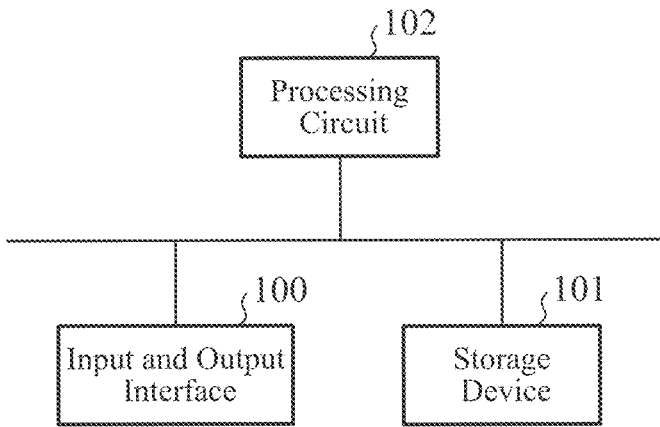
FIG. 14A is a block diagram illustrating a hardware configuration for implementing the functions of a radar signal processor included in the radar device according to the first embodiment.
Figure 14B:
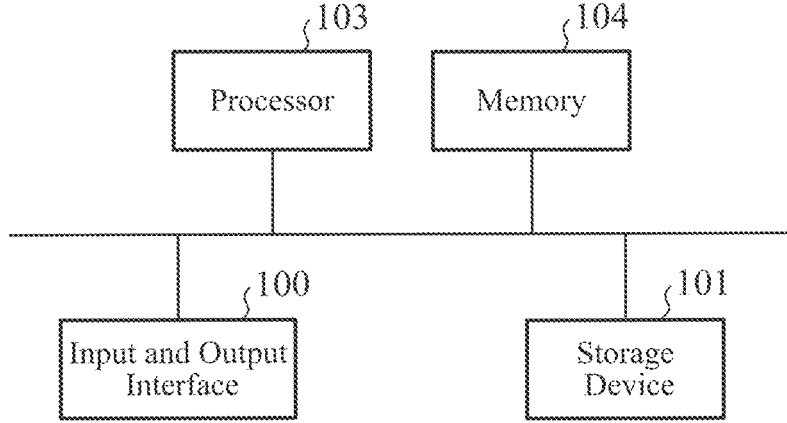
FIG. 14B is a block diagram illustrating a hardware configuration for executing software for implementing the functions of the radar signal processor included in the radar device according to the first embodiment.

FIG. 14A is a block diagram illustrating a hardware configuration for implementing the functions of the radar signal processor 2. FIG. 14B is a block diagram illustrating a hardware configuration for executing software for implementing the functions of the radar signal processor 2. In FIGS. 14A and 14B, an input and output interface 100 is an interface that receives digital data A/D converted by the A/D converter 7, relays a control signal from the control unit 21, and outputs the control signal to the transmission unit and the reception unit. A storage device 101 is a storage device that stores data the input of which has been received by the input and output interface 100, and is the data storage unit 22.

The functions of the control unit 21 and the signal processing unit 23 included in the radar signal processor 2 are implemented by a processing circuit. That is, the radar signal processor 2 includes a processing circuit that executes processing from step ST1 to step ST9 illustrated in FIG. 9. The processing circuit may be dedicated hardware, or may be a CPU that executes a program stored in a memory.

In a case where the processing circuit is a processing circuit 102 of dedicated hardware illustrated in FIG. 14A, the processing circuit 102 corresponds to, for example, a single circuit, a composite circuit, a programmed processor, a parallel programmed processor, an application specific integrated circuit (ASIC), a field-programmable gate array (FPGA), or a combination thereof. The functions of the control unit 21 and the signal processing unit 23 included in the radar signal processor 2 may be implemented by separate processing circuits, or these functions may be collectively implemented by one processing circuit.

In a case where the processing circuit is a processor 103 illustrated in FIG. 14B, the functions of the control unit 21 and the signal processing unit 23 included in the radar signal processor 2 are implemented by software, firmware, or a combination of software and firmware. Note that, software or firmware is written as a program and stored in a memory 104.

The processor 103 implements the functions of the control unit 21 and the signal processing unit 23 by reading and executing the program stored in the memory 104. For example, the radar signal processor 2 includes the memory 104 that stores a program that, when executed by the processor 103, results in execution of the processing of steps ST1 to ST9 illustrated in FIG. 9. These programs cause a computer to execute the procedures or methods performed by the control unit 21 and the signal processing unit 23. The memory 104 may be a computer-readable storage medium storing a program for causing a computer to function as the control unit 21 and the signal processing unit 23.

The memory 104 corresponds to, for example, a nonvolatile or volatile semiconductor memory such as a random access memory (RAM), a read only memory (ROM), a flash memory, an erasable programmable read only memory (EPROM), or an electrically-EPROM (EEPROM); a magnetic disk, a flexible disk, an optical disk, a compact disk, a mini disk, or a DVD.

A part of the functions of the control unit 21 and the signal processing unit 23 may be implemented by dedicated hardware, and the remaining part may be implemented by software or firmware. For example, the function of the control unit 21 is implemented by the processing circuit 102 which is dedicated hardware, and the function of the signal processing unit 23 is implemented by the processor 103 reading and executing a program stored in the memory 104. Thus, the processing circuit can implement the above functions by hardware, software, firmware, or a combination thereof.

Derivation of the above formula (22) from the above formula (11) is as follows.

In the geometry illustrated in FIG. 3, in a case where a spatially extended target g(x,y,z) exists, the spectrum S(x', y',k) related to the reflected signal of the transmission signal transmitted by the transmission antenna Tx1 is expressed by the above formula (7). Here, x' is the x coordinate of the center of the target 9 when the transmission signal is transmitted by the transmission antenna Tx1, y' corresponds to the value of the y coordinate $-y_0$ of the reception antenna Rx that has received the reflected signal of the transmission signal, and the reciprocating distance of the transmission signal is 1(x',y'), which is expressed by the above formula (8). The forward path distance of the transmission signal is $1_T$(x') and is expressed by the above formula (9), and the return path distance of the reflected signal of the transmission signal is $1_R$(x',y') and is expressed by the above formula (10).

A relationship of the following formula (31) is established between a frequency signal S($k_x$,$k_y$,k) and g(x,y,z) calcu lated by two-dimensional Fourier transform of S(x',y',k) with respect to x' and y' by the signal processing unit 23.

$$S(k_x, k_y, k) = \int\int S(x', y', k)e^{-jk_x x'}e^{-jk_y y'}dx'dy' = \tag{31}$$

$$\int\int\int g(x, y, z)dxdydz\int e^{-jkl_T(x')}e^{-jk_x x'}dx'\int e^{-jkl_R(x',y')}e^{-jk_y y'}dy'$$

The last integral part on the right side of the above formula (31) can be calculated by the method of stationary phase (MOSP) and is expressed by the following formula (32).

$$\int e^{-jkl_R(x',y')}e^{-jk_y y'}dy' \approx \tag{32}$$

$$\exp\left[-j\sqrt{k^2-k_y^2}\sqrt{(x-x')^2+(z-z_0)^2}-jk_y(y-y_0)\right]$$

By substituting the above formula (32) into the last integral part of the right side of the above formula (31), the relationship of the following formula (33) is established between S($k_x$,$k_y$,k) and g(x,y,z).

$$S(k_x, k_y, k) \approx \int\int\int g(x, y, z)dxdydz\cdot e^{-jk_y(y-y_0)}. \tag{33}$$

$$\int\exp\left[-jk\sqrt{(x-x'-\Delta x_t)^2+(y-y_0-\Delta y_t)^2+(z-z_0)^2}-\right.$$

$$\left. jk_x x'-j\sqrt{k^2-k_y^2}\sqrt{(x-x')^2+(z-z_0)^2}\right]dx'$$

The last integral part of the first term, the third term, and the fourth term on the right side of the above formula (33) are calculated using MOSP. When these exponent parts are $-j\varphi(x')$, $\varphi(x')$ is decomposed into $\varphi_T(x')$ and $\varphi_R(x')$ as in the following formula (34).

$$\varphi(x') = \left\{k\sqrt{(x-x'-\Delta x_t)^2+(y-y_0-\Delta y_t)^2+(z-z_0)^2}+\frac{k_x}{2}x'\right\}+ \tag{34}$$

$$\left\{\sqrt{k^2-k_y^2}\sqrt{(x-x')^2+(z-z_0)^2}+\frac{k_x}{2}x'\right\}\triangleq\varphi_T(x')+\varphi_R(x')$$

In a case where $\varphi_T$(x') is Taylor approximated to a second order term, when x' at which d$\varphi_T$(x')/dx'=0 is set as $x_T$', $x_T$' is expressed by the following Formula (35). Here, $k_{yz}$ is expressed by the above formula (17), and $R_1$ is expressed by the following formula (36).

$$x_T' = x - \Delta x_t - \frac{k_x}{2k_{yz}}R_1 \tag{35}$$

$$R_1 \triangleq \sqrt{(y-y_0-\Delta y_t)^2+(z-z_0)^2} \tag{36}$$

According to the above formula (35), $\varphi_T$(x') is approximated by the following formula (37).

$$\varphi_T(x') \approx \varphi_T(x_T') + \frac{1}{2}\frac{\partial^2\varphi_T(x_T')}{\partial x'^2}(x'-x_T')^2 = \tag{37}$$

$$k_{yz}R_1 + \frac{k_x}{2}(x-\Delta x_t) + \frac{k_{yz}^3}{2k^2R_1}(x'-x_T')^2$$

Similarly, in a case where $\varphi_R(x')$ is Taylor approximated to a second order term, when x' at which $d\varphi_R(x')/dx'=0$ is set as $x_R'$, $x_R'$ is expressed by the following formula (38). Here, $k_z$ is expressed by the following formula (39), and $R_2$ is expressed by the following formula (40).

$$x_R' = x - \frac{k_x}{2k_z} R_2, \tag{38}$$

$$k_z \overset{\Delta}{=} \sqrt{k^2 - k_y^2 - (k_x/2)^2} \tag{39}$$

$$R_2 \overset{\Delta}{=} z - z_0 \tag{40}$$

According to the above formula (38), $\varphi_R(x')$ is approximated by the following formula (41).

$$\varphi_R(x') \approx \varphi_R(x_R') + \frac{1}{2}\frac{\partial^2 \varphi_R(x_R')}{\partial x'^2}(x' - x_R') = \tag{41}$$
$$k_z R_2 + \frac{k_x}{2}x + \frac{k_z^3}{2(k^2 - k_y^2)R_2}(x' - x_R')^2$$

Therefore, $\varphi(x')$ is approximated by the following formula (42).

$$\varphi(x') = \varphi_T(x') + \varphi_R(x') \approx k_{yz}R_1 + k_z R_2 + \tag{42}$$
$$k_x x - \frac{k_x}{2}\Delta x_t + \frac{k_{yz}^3}{2k^2 R_1}(x' - x_T')^2 + \frac{k_z^3}{2(k^2 - k_y^2)R_2}(x' - x_R')^2$$

In a case where the third term and the fourth term on the right side of the above formula (42) are Taylor approximated to the first order term, when x' in which the derivative with respect to x' in these terms is 0 is $x_c'$, $x_c'$ is expressed by the following formula (43). Here, A is expressed by the following formula (44), and B is expressed by the following formula (45).

$$x_c' = \frac{1}{A+B}(Ax_T' + Bx_R') \tag{43}$$

$$A \overset{\Delta}{=} \frac{8k_{yz}^3}{k^2 R_1} \tag{44}$$

$$B \overset{\Delta}{=} \frac{8k_z^3}{(k^2 - k_y^2)R_2} \tag{45}$$

The third term and the fourth term on the right side of the above formula (42) are expressed by the following formula (46).

$$\frac{k_{yz}^3}{2k^2 R_1}(x' - x_T')^2 + \frac{k_z^3}{2(k^2 - k_y^2)R_2}(x' - x_R')^2 \approx \tag{46}$$
$$\frac{k_{yz}^3 k_z^3}{2\{k_z^3 k^2 R_1 + k_{yz}^3(k^2 - k_y^2)R_2\}}\left(\Delta x_t + \frac{k_x}{2k_{yz}}R_1 - \frac{k_x}{2k_z}R_2\right)^2$$

Therefore, $\varphi(x')$ is finally approximated by the following formula (47).

$$\varphi(x') = \varphi_T(x') + \varphi_R(x') \approx k_{yz}R_1 + k_z R_2 + k_x x - \tag{47}$$
$$\frac{k_x}{2}\Delta x_t + \frac{k_{yz}^3 k_z^3}{2\{k_z^3 k^2 R_1 + k_{yz}^3(k^2 - k_y^2)R_2\}}\left(\Delta x_t + \frac{k_x}{2k_{yz}}R_1 - \frac{k_x}{2k_z}R_2\right)^2$$

When $\varphi(x')$ is expressed by the above formula (47), a relationship of the following formula (48) is established between $S(k_x,k_y,k)$ and $g(x,y,z)$.

$$S(k_x, k_y, k) \approx \iiint g(x, y, z)dxdydz \cdot e^{-jk_y(y-y_0)} \cdot \tag{48}$$
$$\exp\left[-jk_{yz}\sqrt{(y - y_0 - \Delta y_t)^2 + (z - z_0)^2} - jk_z(z - z_0) - jk_x x + j\frac{k_x}{2}\Delta x_t\right] \cdot$$
$$\exp\left[-j\frac{k_{yz}^3 k_z^3}{2\{k_z^3 k^2 R_1 + k_{yz}^3(k^2 - k_y^2)R_2\}}\left(\Delta x_t + \frac{k_x}{2k_{yz}}R_1 - \frac{k_x}{2k_z}R_2\right)^2\right]$$

For $-jk_{yz}\{(y-y_0-\Delta y_t)^2+(z-z_0)^2\}^{1/2}$ on the right side of the above formula (48), a plane wave approximation is introduced to remove this square root. For example, when the center of coordinates of the target $g(x,y,z)$ on the y-z plane is $(y_{cnt}, z_{cnt})$, the square root part can be approximated by a plane wave as expressed by the following formula (49). Here, $k_{y,inc}$ is defined by the above formula (15), and $k_{z,inc}$ is defined by the above formula (16). $\cos \theta_{inc}$ is defined by the above formula (18), and $\sin \theta_{inc}$ is defined by the above formula (19).

$$\exp\left[-jk_{yz}\sqrt{(y - y_0 - \Delta y_t)^2 + (z - z_0)^2}\right] = \tag{49}$$
$$\exp\left[-jk_{y,inc}(y - y_0 - \Delta y_t) - jk_{z,inc}(z - z_0)\right]$$

By substituting the above formula (49) into $-jk_{yz}\{(y-y_0-\Delta y_t)^2+(z-z_0)^2\}^{1/2}$, which is the square root part on the right side of the above formula (48), and organizing, the following approximate relational expression (50) finally holds between $S(k_x,k_y,k)$ and $g(x,y,z)$. Here, $k_y'$ is defined by the above formula (12), and $k_z'$ is defined by the above formula (13).

$$S(k_x, k_y, k) \approx \iiint g(x, y, z)\exp\{-j(k_x x + k_y' y + k_z' z)\}dxdydz \cdot \exp \tag{50}$$
$$\left\{j\left(k_x\frac{\Delta x_t}{2} + k_y y_0 + k_z z_0\right)\right\} \cdot \exp\{j(k_{y,inc}(y_0 + \Delta y_t) + k_{z,inc}z_0)\} \cdot$$
$$\exp\left[-j\frac{k_{yz}^3 k_z^3}{2\{k_z^3 k^2 R_1 + k_{yz}^3(k^2 - k_y^2)R_2\}}\left(\Delta x_t + \frac{k_x}{2k_{yz}}R_1 - \frac{k_x}{2k_z}R_2\right)^2\right]$$

Therefore, $g(x, y, z)$ can be estimated from $S(k_x,k_y,k)$ by the above formulas (11) to (22).

As described above, the radar device 1 according to the first embodiment repeatedly executes a series of processing of transmitting transmission signals to space using the transmission antennas Tx1 to TxM arranged linearly, receiving reflected signals that are the transmission signals reflected in space using the reception antennas Rx1 to RxN arranged linearly in the same direction as the transmission antennas, transmitting transmission signals simultaneously from the transmission antennas Tx1 to TxM, and receiving reflected signals by the reception antennas Rx1 to RxN to acquire digital data. By using digital data sequentially acquired by a series of processing repeatedly executed as two-dimensional array data, a three-dimensional radar image of the target 9 moved in a direction crossing the antenna arrangement direction of the transmission antennas Tx1 to TxM and the reception antennas Rx1 to RxN is generated. As a result, the signal transmission interval of the transmission antennas Tx1 to TxM is shortened, and thus the influence of the movement of the target 9 within the time of the signal transmission interval is reduced. For example, when the number of transmission antennas is N and the signal transmission interval of one transmission antenna in the conventional radar device of the TDM-MIMO system is T(s), the signal transmission interval of one transmission antenna can be shortened to T/N(s) in the radar device 1 of the DDM-MIMO system. Therefore, reception signals derived from transmission signals from different transmission antennas can be coherently added, and the SN ratio of the three-dimensional radar image becomes N times improved, so that the radar device 1 can improve the resolution of the three-dimensional radar image.

Second Embodiment

Figure 15:
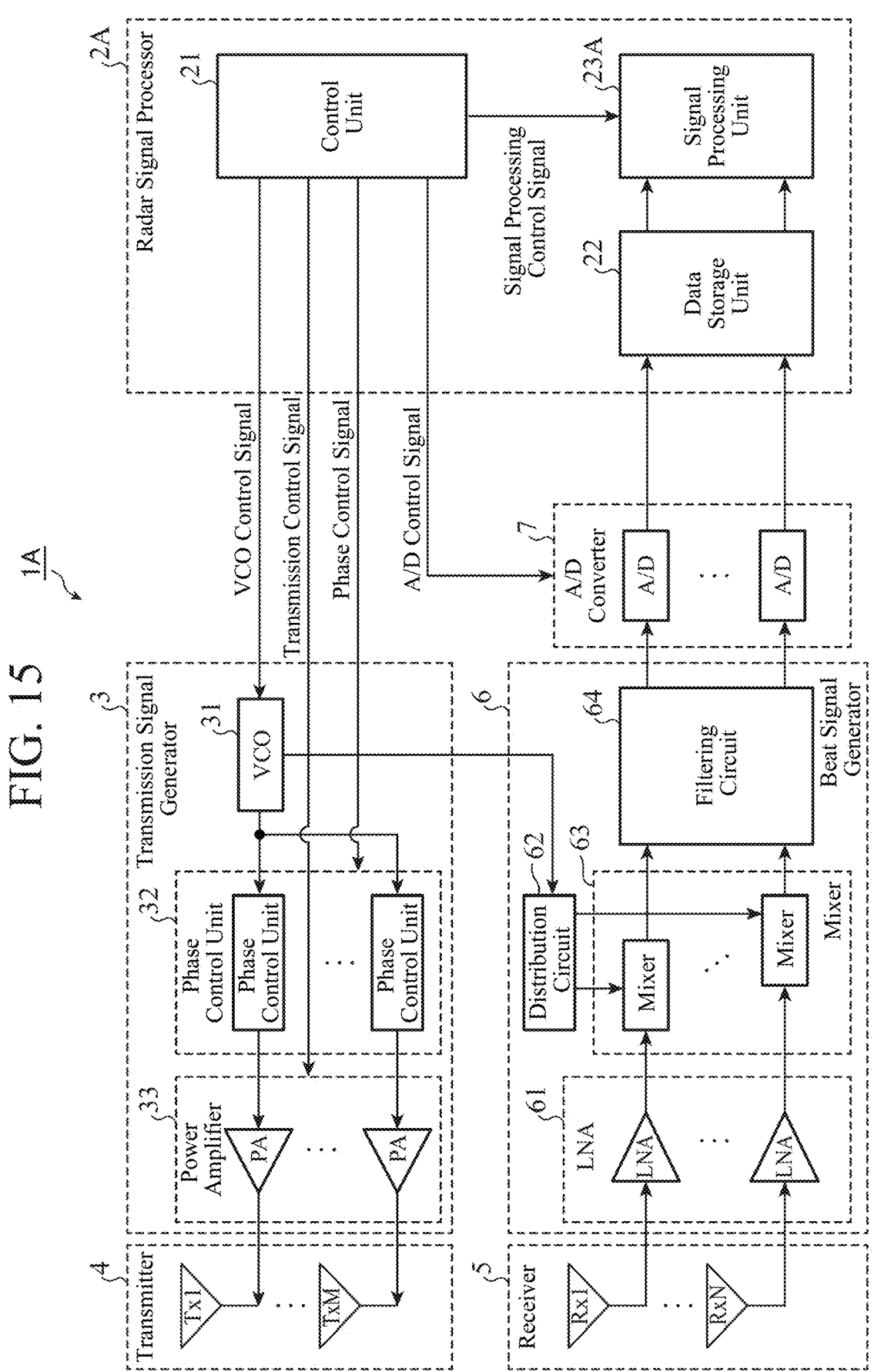
FIG. 15 is a block diagram illustrating a configuration of a radar device according to a second embodiment.

FIG. 15 is a block diagram illustrating a configuration of a radar device 1A according to a second embodiment, and illustrates an FMCW radar device. In FIG. 15, the same components as those in FIG. 1 are denoted by the same reference numerals, and the description thereof will be omitted. Similarly to the radar device 1, the radar device 1A transmits transmission signals as radio waves to space using a one-dimensional array antenna, and receives reflected waves that are the transmitted radio waves reflected by a target existing in the space and returned, thereby generating a three-dimensional radar image of the target. For example, the radar device 1A is used in a millimeter wave security system that performs a body check on a detection object continuously coming in real time without hindering the movement of the detection object. Hereinafter, description will be given on the assumption that the radar device 1A is a millimeter wave security system that sequentially reproduces three-dimensional radar images of a moving detection object.

The radar device 1A includes a radar signal processor 2A, a transmission signal generator 3, a transmitter 4, a receiver 5, a beat signal generator 6, and an A/D converter 7. The radar signal processor 2A includes a control unit 21, a data storage unit 22, and a signal processing unit 23A. The control unit 21 sets the pulse repetition interval of the transmission signals simultaneously transmitted from the transmission antennas Tx1 to TxM to be constant, and sets the initial phase change amount between the transmission signals at the pulse repetition interval to a different value for each transmission antenna. The signal processing unit 23A generates a three-dimensional radar image of the detection object by performing sequential Fourier transform on the digital data of the reflected signals sequentially received at the pulse repetition interval by the reception antennas Rx1 to RxN into a signal in the Doppler frequency domain.

A radar image generation method according to the second embodiment is as follows.

FIG. 16 is a flowchart illustrating a radar image generation method according to the second embodiment. In FIG. 16, the processing from step ST4a to step ST10a is similar to the processing from step ST3 to step ST9 illustrated in FIG. 9. The signal processing unit 23A generates reception signals s(y',k|h) column by column (step ST1a).

For example, in the sequential discrete Fourier transform in the one-dimensional Fourier transform, a short-time discrete Fourier transform of N points with respect to the discrete signal x(n) (n=0, 1, 2,) is expressed by the following Formula (51). Here, $\omega_N$ is expressed by the following formula (52).

$$X(k_x, h) = \sum_{n=0}^{N-1} x(h + n)\omega_N^{k_x n}, \tag{51}$$

$$k_x = 0, 1, 2, \dots, N - 1;$$

$$h = 0, 1, 2, \dots$$

$$\omega_N = \exp\left(-j\frac{2\pi}{N}\right) \tag{52}$$

By transforming the above formula (51), the following formula (53) of the sequential discrete Fourier transform can be derived.

$$X(k_x, h) = \{X(k_x, h - 1) - x(h - 1)\}\omega_N^{-k_x} + x(h + N - 1)\omega_N^{k_x(N-1)} \tag{53}$$

By using the above formulas (51) and (53), the calculation speed required for the radar device 1A to generate a three-dimensional radar image is increased. For example, in the case of reproducing temporally continuous three-dimensional radar images, the chirp number of the most recent transmission signal is set to h, and the three-dimensional radar image is reproduced using reception signals of N chirps from the chirp numbers (h–N+1) to h. The signal processing unit 23A performs one-dimensional Fourier transform on the reception signal s(y',k|h) with the chirp number h with respect to y' to generate a two-dimensional frequency signal s(y',k|h) (step ST2a). In parallel with the generation of the two-dimensional frequency signal s(y', k|h), the signal processing unit 23A performs three-dimensional Fourier transform on the reception signals corresponding to the latest N chirps from the chirp numbers (h–N+1) to h. As a result, a three-dimensional frequency signal S(k_x,k_y,k|h) is generated.

By performing the sequential discrete Fourier transform expressed by the above formula (53), relations represented by the following formulas (54), (55), and (56) are established between s(y,k|h) and S(k_x,k_y,k|h). However, in the following formulas (54), (55), and (56), it is abbreviated as $S_{ij|h}(k_x)=S(k_x,k_y=i,k=j|h)$ and $s_{ij|h}=s(k_y=i,k=j|h)$. The signal processing unit 23A applies the following formulas (54), (55), and (56) to all $k_y,k$ to execute sequential FFT (step ST3a). As a result, $S(k_x,k_y,k)$ of each of the transmission antennas Tx1 to Tx4 is generated. The following processing is similar to the processing in and after step ST3 in FIG. 9.

$$S_{ij|h}(k_x) = \{S_{ij|h-1}(k_x) - s_{ij|h-N}\}\omega_N^{-k_z} + s_{ij|h}\omega_N^{k_x(N-1)} \quad (h \geq N + 1) \tag{54}$$

$$S_{ij|h}(k_x) = S_{ij|h-1}(k_x)\omega_N^{-k_x} + s_{ij|h}\omega_N^{k_x(N-1)} \quad (N \geq h \geq 2) \tag{55}$$

$$S_{ij|h}(k_x) = s_{ij|h}\omega_N^{k_x(N-1)} \quad (h = 1) \tag{56}$$

As described above, in the radar device 1A according to the second embodiment, the signal processing unit 23A generates the three-dimensional radar image of the target 9 by performing sequential Fourier transform on the digital data of the reflected signals sequentially received at the pulse repetition interval by the reception antenna Rx into the signal in the Doppler frequency domain. As a result, the radar device 1A can generate a three-dimensional radar image of the target 9 at high speed.

Third Embodiment

Figure 17:
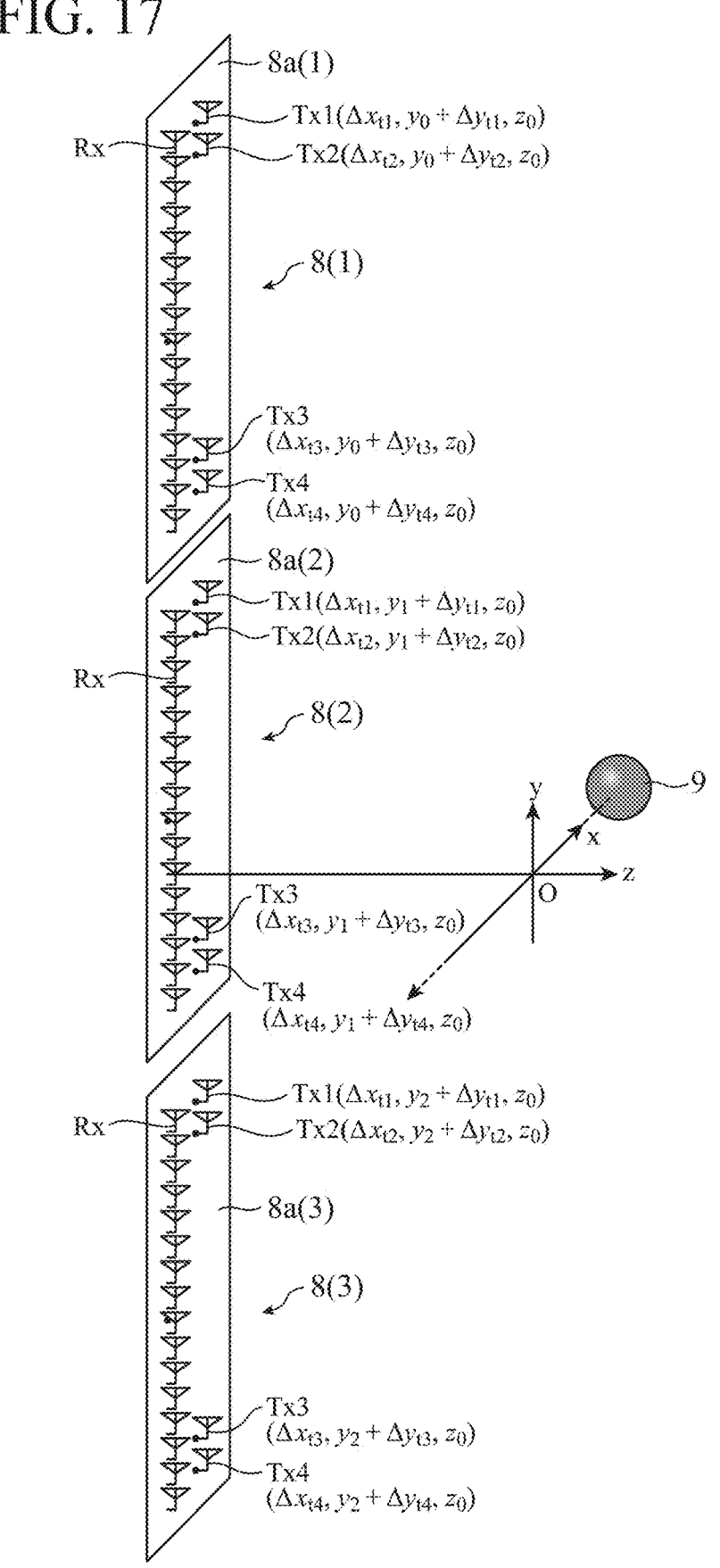
FIG. 17 is a schematic diagram illustrating a positional relationship between three one-dimensional array antennas included in a radar device according to a third embodiment and a target.

FIG. 17 is a schematic diagram illustrating a positional relationship between three one-dimensional array antennas 8(1) to 8(3) included in a radar device according to the third embodiment and the target 9. In order to improve the resolution in the y direction (vertical direction) in the three-dimensional radar image of the detection object, it is necessary to increase the virtual aperture length of MIMO in the y direction. The virtual aperture of MIMO can be implemented by arranging a plurality of substrates 8a illustrated in FIG. 3 densely in the y direction.

When all the transmission antennas in one one-dimensional array antenna are arranged in a concentrated manner in the central portion of the substrates 8a(1) to 8a(3), a large gap in which no virtual element exists occurs at a plurality of locations in a virtual array of MIMO in which the substrates 8a(1) to 8a(3) are arranged in the y direction. When this gap exists, for example, by coherently adding all the reception signals received by the one-dimensional array antennas 8(1) to 8(3) provided on each three substrates 8a(1) to 8a(3), a large ripple occurs in the reproduced three-dimensional radar image.

On the other hand, in the radar device according to the third embodiment, as illustrated in FIG. 17, at least one transmission antenna is disposed at the first end (end in the +y direction) of each substrate 8a and the second end (end in the −y direction) facing the first end portion. A virtual array of MIMO constituted by the one-dimensional array antennas 8(1) to 8(3) is obtained by arranging, in the y direction, three substrates 8a in which at least one transmission antenna is disposed at a first end and a second end. With this structure, the radar device 1A can prevent, for example, a large gap in which no virtual element exists from occurring in the MIMO virtual array.

Figure 18A:
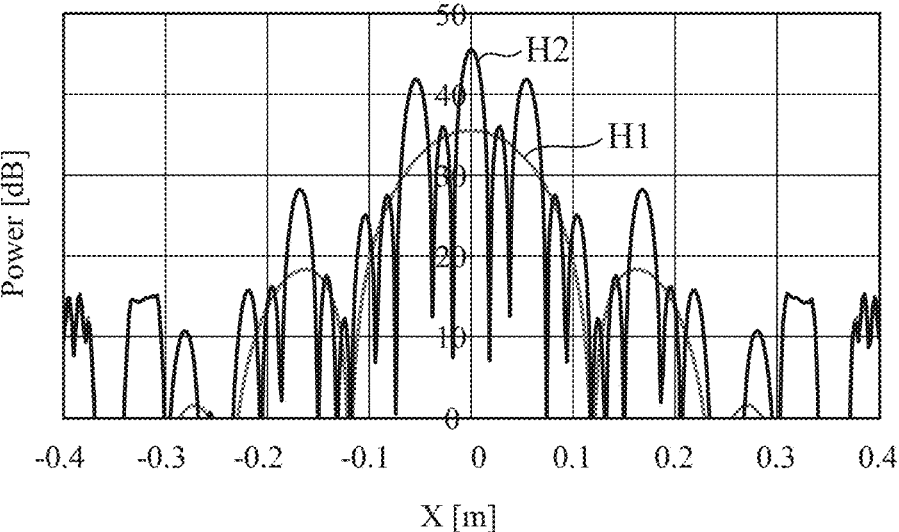
FIG. 18A is a characteristic diagram illustrating a characteristic of a signal related to a point diffusion function of a point target in a case where a radar image of the point target is reproduced using a one-dimensional array antenna in which all transmission antennas are arranged at the center of a substrate.

FIG. 18A is a characteristic diagram illustrating characteristics of a signal related to a point spread function of a target 9 in a case where a three-dimensional radar image of the target 9 is reproduced using a one-dimensional array antenna 8 in which all transmission antennas Tx1 to TxM are arranged at the center of a substrate 8a. In FIG. 18A, a characteristic H1 is a characteristic of a signal related to the point spread function of the target 9 in a case where the three-dimensional radar image of the target 9 is reproduced by the radar device 1 having one one-dimensional array antenna 8, that is, one substrate 8a illustrated in FIG. 3. A characteristic H2 is a characteristic of a signal related to the point spread function of the target 9 when the three-dimensional radar image of the target 9 is reproduced by the radar device having the one-dimensional array antennas 8(1) to 8(3) illustrated in FIG. 17.

In a case where all the transmission antennas Tx1 to TxM are arranged in each central portions of the substrates 8a(1) to 8a(3), as illustrated in FIG. 18A, even if all the signals received by the one-dimensional array antennas 8(1) to 8(3) provided in the substrates 8a(1) to 8a(3) are coherently added, a clear point image is not reproduced, and a large ripple occurs in the main lobe.

Figure 18B:
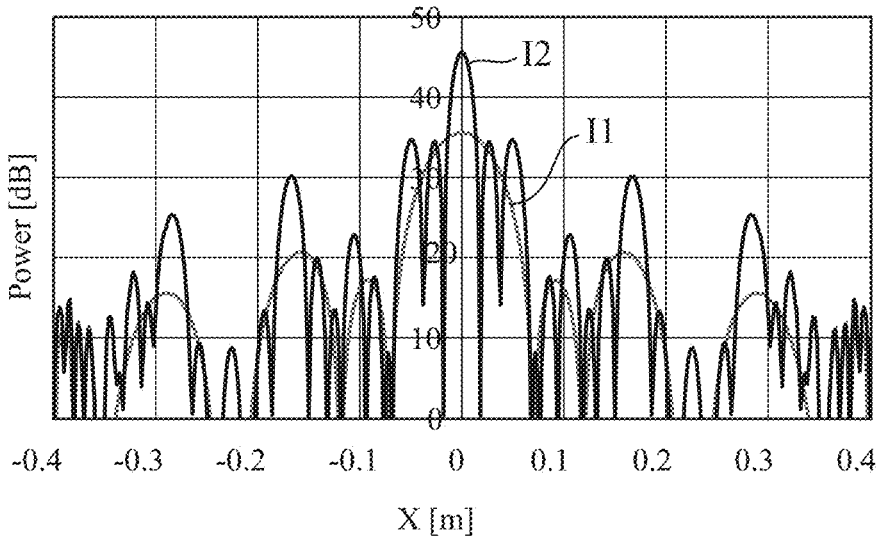
FIG. 18B is a characteristic diagram illustrating a characteristic of a signal related to the point diffusion function of the point target in which the radar image is reproduced using a one-dimensional array antenna in which at least one transmission antenna is disposed at both ends of the substrate.

FIG. 18B is a characteristic diagram illustrating a characteristic of a signal related to the point spread function of the target 9 when a three-dimensional radar image is reproduced using the one-dimensional array antenna 8 in which at least one transmission antenna Tx is disposed at both ends of the substrate 8a. In FIG. 18A, a characteristic I1 is a characteristic of a signal related to the point spread function of the target 9 in a case where a three-dimensional radar image of the target 9 is reproduced by the radar device 1 having one substrate 8a illustrated in FIG. 3. A characteristic I2 is a characteristic of a signal related to the point spread function of the target 9 when a three-dimensional radar image of the target 9 is reproduced by the radar device having the one-dimensional array antennas 8(1) to 8(3) illustrated in FIG. 17.

When at least one transmission antenna Tx is disposed at the first end and the second end of each of the substrates 8a(1) to 8a(3), as illustrated in FIG. 18B, by coherently adding all the signals received by the one-dimensional array antennas 8(1) to 8(3), the ripple of the main lobe is suppressed, and a peak with large coherence is obtained.

As described above, the radar device according to the third embodiment includes the three one-dimensional array antennas 8(1) to 8(3), and the one-dimensional array antennas 8(1) to 8(3) are linearly arranged. In the one-dimensional array antennas 8(1) to 8(3), at least one transmission antenna of the transmission antennas Tx is disposed at the first end and the second end of the substrates 8a(1) to 8a(3). With this configuration, it is possible to obtain a peak with large coherence while suppressing the ripple of the main lobe.

The radar devices described in the first to third embodiments can be used in a system that detects a person on an escalator or a moving walkway. For example, by arranging the one-dimensional array antennas 8 one by one on both sides of the escalator or the moving walkway, the radar device can monitor whether or not a person on the escalator or the moving walkway possesses metal or non-metal prohibited articles from both left and right sides.

In addition, the radar devices described in the first to third embodiments can be used not only for a person but also for baggage inspection. For example, in a baggage inspection device at a station, an airport, or the like, baggage is placed on a belt conveyor, and the belt conveyor operates in this state. By arranging the one-dimensional array antennas on both sides of the belt conveyor, it is possible to monitor whether or not a baggage moving on the belt conveyor includes a metal or non-metal prohibited article from both left and right sides.

Furthermore, the radar devices described in the first to third embodiments can monitor whether or not a car, a bicycle, or a person who has passed through a road possesses a metal or non-metal prohibited article by arranging the one-dimensional array antennas outdoor by the side of the road.

Note that combinations of each embodiments, modifications of any components of each of the embodiments, or omissions of any components in each of the embodiments are possible.

INDUSTRIAL APPLICABILITY

The radar device according to the present disclosure can be used for, for example, an imaging radar device.

REFERENCE SIGNS LIST 1, 1A: radar device, 2, 2A: radar signal processor, 3: transmission signal generator, 4: transmitter, 5: receiver, 6: beat signal generator, 7: A/D converter, 8, 8(1) to 8(3): one-dimensional array antenna, 8a, 8a(1) to 8a(3): substrate, 9: target, 21: control unit, 22: data storage unit, 23, 23A:

signal processing unit, 31: VCO, 32: phase control unit, 33: power amplifier, 41: transmission linear array, 51: reception linear array, 61: LNA, 62: distribution circuit, 63: mixer, 64: filtering circuit, 100: input and output interface, 101: storage device, 102: processing circuit, 103: processor, 104: memory, Rx, Rx1 to RxN, Rx1 to Rx16: reception antenna, Tx, Tx1 to TxM, Tx1 to Tx4: transmission antenna

The invention claimed is:

1. A radar device, comprising:

a transmitter to transmit transmission signals to space by using a plurality of transmission antennas arranged linearly and a receptor to receive reflected signals that are the transmission signals reflected in the space by using a plurality of reception antennas linearly arranged in the same direction as a plurality of the transmission antennas, and acquire digital data of the received signals;

a controller to cause the transmitter and the receptor to repeatedly execute a series of processing in which the transmitter simultaneously transmits the transmission signals from a plurality of the transmission antennas and the receptor receives the reflected signals by a plurality of the reception antennas and acquires the digital data; and a signal processor to generate a three-dimensional radar image of a detection object moved in a direction crossing an antenna arrangement direction of a plurality of the transmission antennas and a plurality of the reception antennas by using the digital data sequentially acquired in the series of processing repeatedly executed as two-dimensional array data, wherein at least one first transmission antenna of a plurality of the transmission antennas is disposed at a first end of a substrate and at least one second transmission antenna of the plurality of transmission antennas is disposed at a second end of the substrate opposite to the first end of the substrate, the controller sets a pulse repetition interval of the transmission signals simultaneously transmitted from a plurality of the transmission antennas to be constant, and sets an initial phase change amount between the transmission signals at the pulse repetition interval to a different value for each of the transmission antennas, the transmitter simultaneously transmits the transmission signals having initial phase change amounts different for each of the transmission antennas from a plurality of the transmission antennas and multiplexes the transmission signals on a Doppler frequency axis such that the radar device implements a Doppler division multiplexing-multiple input multiple output (DDM-MIMO) system, and the signal processor generates two dimensional frequency signals by performing one dimensional Fourier transform on a plurality of reception signals which are reflected signals sequentially received in the pulse repetition intervals by the reception antenna, generates first compressed data by performing bulk compression on data of each reception path for each respective transmission antenna, generates three dimensional frequency signals by performing three dimensional Fourier transform on the plurality of reception signals parallel to generating the two dimensional frequency signals, generates signals of the three-dimensional radar image of the detection object for each of the transmission antennas using the two dimensional frequency signals and the three dimensional frequency signals generated in parallel and generates a final three-dimensional radar image of the detection object by coherently adding signals of the three-dimensional radar image generated for each of the transmission antennas.

2. The radar device according to claim 1, wherein a plurality of the reception antennas are arranged at equal intervals.

3. The radar device according to claim 1, comprising a plurality of array antennas in which a plurality of the transmission antennas and a plurality of the reception antennas are arranged on the substrate, wherein a plurality of the array antennas are linearly arranged.

4. The radar device according to claim 1, wherein the signal processor is configured to generate second compressed data by performing bulk compression for each transmission path on the first compressed data for each respective transmission antenna.

5. The radar device according to claim 4, wherein the signal processor is configured to generate corrected data by performing bistatic arrangement correction on the second compressed data.

6. The radar device according to claim 5, wherein the signal processor is configured to generate interpolated data by performing Stolt interpolation on the corrected data, and use the interpolated data to generate the three-dimensional frequency signals.

7. A radar image generation method of a radar device including, a transmitter to transmit transmission signals to space by using a plurality of transmission antennas arranged linearly, and a receptor to receive reflected signals that are the transmission signals reflected in the space by using a plurality of reception antennas linearly arranged in the same direction as a plurality of the transmission antennas, and acquire digital data of the received signals, the method comprising:

causing the transmitter and the receptor to repeatedly execute a series of processing in which the transmitter simultaneously transmits the transmission signals from a plurality of the transmission antennas and the receptor receives the reflected signals by a plurality of the reception antennas and acquires the digital data; and generating a three-dimensional radar image of a detection object moved in a direction crossing an antenna arrangement direction of a plurality of the transmission antennas and a plurality of the reception antennas by using the digital data sequentially acquired in the series of processing repeatedly executed as two-dimensional array data, wherein at least one first transmission antenna of a plurality of the transmission antennas is disposed at a first end of a substrate and at least one second transmission antenna of the plurality of transmission antennas is disposed at a second end of the substrate opposite to the first end of the substrate, wherein the controller sets a pulse repetition interval of the transmission signals simultaneously transmitted from a plurality of the transmission antennas to be constant, and sets an initial phase change amount between the transmission signals at the pulse repetition interval to a different value for each of the transmission antennas, wherein the transmitter simultaneously transmits the transmission signals having initial phase change amounts different for each of the transmission antennas and multiplexes the transmission signals on a Doppler frequency axis such that the radar device implements a Doppler division multiplexing-multiple input multiple output (DDM-MIMO) system, and the signal processor generates two dimensional frequency signals by performing one dimensional Fourier transform on a plurality of reception signals which are reflected signals sequentially received in the pulse repetition intervals by the reception antenna, generates first compressed data by performing bulk compression on data of each reception path for each respective transmission antenna, generates three dimensional frequency signals by performing three dimensional Fourier transform on the plurality of reception signals parallel to generating the two dimensional frequency signals, generates signals of the three-dimensional radar image of the detection object for each of the transmission antennas using the two dimensional frequency signals and the three dimensional frequency signals generated in parallel and generates a final three-dimensional radar image of the detection object by coherently adding signals of the three-dimensional radar image generated for each of the transmission antennas.

* * * * *